(12) United States Patent
Yura et al.

(10) Patent No.: US 8,409,388 B2
(45) Date of Patent: Apr. 2, 2013

(54) METHOD AND SYSTEM FOR MANUFACTURING OPTICAL DISPLAY DEVICE

(75) Inventors: Tomokazu Yura, Ibaraki (JP); Kazuo Kitada, Ibaraki (JP); Satoru Koshio, Ibaraki (JP); Takuya Nakazono, Ibaraki (JP)

(73) Assignee: Nitto Denko Corporation, Ibaraki-shi, Osaka (JP)

(*) Notice: Subject to any disclaimer, the term of this patent is extended or adjusted under 35 U.S.C. 154(b) by 47 days.

(21) Appl. No.: 13/314,225

(22) Filed: Dec. 8, 2011

(65) Prior Publication Data

US 2012/0132369 A1 May 31, 2012

Related U.S. Application Data

(62) Division of application No. 12/937,609, filed as application No. PCT/JP2009/057272 on Apr. 9, 2009.

(30) Foreign Application Priority Data

Apr. 15, 2008 (JP) ................................. 2008-105985
Apr. 7, 2009 (JP) ................................. 2009-093181

(51) Int. Cl.
*B32B 41/00* (2006.01)

(52) U.S. Cl. ....... 156/182; 156/64; 156/304.1; 156/350; 156/361; 156/363; 156/378; 156/379

(58) Field of Classification Search .................... 156/64, 156/182, 304.1, 350, 361, 363, 378, 379
See application file for complete search history.

(56) References Cited

U.S. PATENT DOCUMENTS

| | | |
|---|---|---|
| 2005/0016670 A1 | 1/2005 | Kanbara et al. |
| 2006/0124248 A1 | 6/2006 | Kanbara et al. |
| 2006/0137813 A1 | 6/2006 | Robrecht et al. |
| 2006/0191630 A1 | 8/2006 | Tait et al. |
| 2006/0225827 A1 | 10/2006 | Lei et al. |

(Continued)

FOREIGN PATENT DOCUMENTS

| | | |
|---|---|---|
| JP | 06-099503 A | 4/1994 |
| JP | 2004-250213 A | 9/2004 |

(Continued)

OTHER PUBLICATIONS

International Search Report of PCT/JP2009/057272, mailing date Jul. 14, 2009.

(Continued)

*Primary Examiner* — Katarzyna Wyrozebski Lee
*Assistant Examiner* — Joshel Rivera
(74) *Attorney, Agent, or Firm* — Westerman, Hattori, Daniels & Adrian, LLP

(57) ABSTRACT

A system for manufacturing an optical display device includes an optical display unit feeding apparatus with a counting section counting the number of optical display units fed, an optical film feeding apparatus with a roll exchanging section exchanging a roll of a previous category for a roll of a latter category and joining the optical films on each, a bonding apparatus bonding a cut optical film onto a surface of an optical display unit, and a controller storing the number N of optical display units that are bonded correspondingly with the optical films that are present from a joining position to a bonding position of the optical film, and stops the apparatuses when the number of remaining sheets of the optical display units of the previous category prior to bonding becomes substantially equal to the number N at the time of exchanging categories based on information from the counting section.

6 Claims, 6 Drawing Sheets

U.S. PATENT DOCUMENTS

| | | |
|---|---|---|
| 2006/0225831 A1 | 10/2006 | Lei et al. |
| 2007/0295457 A1 | 12/2007 | Roberge et al. |
| 2009/0159175 A1 | 6/2009 | Nakahira et al. |
| 2009/0218049 A1 | 9/2009 | Kanbara et al. |
| 2009/0286098 A1 | 11/2009 | Yajima et al. |
| 2009/0301659 A1 | 12/2009 | Nagura |
| 2010/0024954 A1* | 2/2010 | Ito et al. ............ 156/64 |

FOREIGN PATENT DOCUMENTS

| | | |
|---|---|---|
| JP | 2005-037417 A | 2/2005 |
| JP | 2005-309371 A | 11/2005 |
| JP | 2007-140046 A | 6/2007 |
| TW | 200639452 A | 3/1995 |
| TW | 200740588 A | 12/1995 |
| TW | 200637728 A | 12/2004 |
| WO | 2006/118216 A1 | 11/2006 |

OTHER PUBLICATIONS

Japanese Office Action dated Apr. 28, 2010, issued in corresponding Japanese Patent Application No. 2009-093181.

Notification of Transmittal of Copies of Translation of the International Preliminary Report on Patentability (Form PCT/IB/338 of International Application No. PCT/JP2009/057272 mailed Dec. 9, 2010 with Forms PCT/IB/373 and PCT/ISA/237.

Taiwanese Office Action dated May 18, 2011, issued in corresponding Taiwanese Patent Application No. 098112385.

* cited by examiner

METHOD AND SYSTEM FOR MANUFACTURING OPTICAL DISPLAY DEVICE

This application is a divisional of U.S. application Ser. No. 12/937,609, filed on Oct. 13, 2010, which is a National Stage of International Application No. PCT/JP2009/057272, filed on Apr. 9, 2009, which claims priority to Japanese priority application No. 2008-105985 filed on Apr. 15, 2008 and Japanese priority application No. 2009-093181 filed on Apr. 7, 2009, which are hereby incorporated by reference.

TECHNICAL FIELD

The present invention relates to a method and a system for manufacturing an optical display device for bonding an optical film including a polarizing plate onto an optical display unit.

BACKGROUND ART

FIG. 6 conceptually shows a method for manufacturing an optical display device mounted on a conventional liquid crystal display device. First, an optical film maker produces a long (band-shaped) sheet material having an optical film as a material roll (#1). A specific step of manufacturing this is a known manufacturing step, so that the description will be omitted. As the material roll of this long (band-shaped) sheet material, there are, for example, a polarizing plate material roll, a retardation plate material roll, a lamination film material roll of a polarizing plate and a retardation plate, and the like used in a liquid crystal display device. Subsequently, the material roll is slit into a predetermined size (size according to the size of the optical display unit) (#2). Next, the slit long material roll is cut into a predetermined length in accordance with the size of the optical display unit to be bonded (#3). Next, the pieces of sheet materials (optical film) cut into a predetermined length are subjected to inspection of outer appearance (#4). This inspection method may be, for example, a defect inspection by eye observation or an inspection using a known defect inspection apparatus. The defect means, for example, contamination on the surface or in the inside, scratches, a special defect (which may be referred to as a knick) like a twist of a hit trace shape that has bitten a contaminant, an air bubble, a contaminant, or the like. Next, a finished product inspection is carried out (#5). The finished product inspection is an inspection that accords to a stricter quality standard of non-defective product determination than that of an outer appearance inspection. Next, the four end surfaces of the pieces of sheet materials are subjected to end surface processing (#6). This is carried out for preventing a pressure-sensitive adhesive or the like from extending out from the end surfaces during the transportation. Next, in a clean room environment, the pieces of sheet materials are subjected to clean packaging (#7). Next, packaging is carried out for transportation (transport packaging) (#8). In the above manner, pieces of sheet materials are manufactured and transported to an optical display device processing manufacturer.

In the optical display device processing manufacturer, the transported pieces of sheet materials are subjected to unpacking (#11). Next, an outer appearance inspection is carried out for inspecting the scratches, contamination, or the like that has been generated during the transportation or at the time of unpacking (#12). The pieces of sheet materials determined to be non-defective by the inspection are conveyed to a next step. Here, there are cases in which this outer appearance inspection is omitted. An optical display unit (for example, a glass substrate unit having a liquid crystal cell enclosed therein) to which a piece of sheet material is to be bonded is manufactured in advance, and the optical display unit is cleaned before the bonding step (#13).

The piece of sheet material and the optical display unit are bonded (#14). A release film is peeled off from the piece of sheet material while leaving the pressure-sensitive adhesive layer, and the resultant is bonded to one surface of the optical display unit with the pressure-sensitive adhesive layer serving as a bonding surface. Further, a piece of sheet material can also be bonded to the other surface of the optical display unit. In the case of bonding onto both surfaces, either optical films having the same configuration or optical films having different configurations may be bonded to respective surfaces of the optical display unit. Next, inspection of the optical display device in a state in which the optical films are bonded and a defect inspection are carried out (#15). The optical display device determined to be non-defective in this inspection is transported to a mounting process (#16). On the other hand, the optical display device determined to be defective is subjected to a reworking process (#17). In the reworking process, the optical film is peeled off from the optical display unit. Onto the optical display unit having been subjected to the reworking process, an optical film is newly bonded (#14).

In the above manufacturing step, in particular, end surface processing, packaging of the pieces of sheet materials, unpacking, and the like are needed steps because the optical film maker and the optical display device processing manufacturer are located at different places. However, there is a problem of increase in the manufacturing costs caused by multiple steps. Also, there are a problem of scratches, dusts, contamination, or the like generated by the multiple steps or transportation, the necessity of an inspection step accompanying this, and further a problem in that other kinds of pieces of sheet materials need to be stored and managed as a stock.

As a method of solving these, Japanese Unexamined Patent Publication No. 2007-140046 (Patent Document 1) is proposed. This invention includes feeding means for drawing and feeding a long sheet material having a optical film serving as a member of an optical display device out from a roll on which the long sheet material is wound up, detecting means for detecting defects of the long sheet material that has been drawn out by the feeding means, cutting and processing means for cutting the long sheet material and processing the long sheet material into individual sheet materials based on the detection result by the detecting means, carrying means for carrying in order to perform a bonding process on the sheet material that has been cut and processed by the cutting and processing means, and bonding processing means for bonding the sheet material carried by the carrying means onto an optical display unit serving as a member of an optical display device, characterized in that these means are arranged on consecutive manufacturing line steps. According to the above configuration, the long sheet material having an optical film can be directly subjected to a cutting process into a desired size, and this cut sheet material can be bonded onto an optical display unit. Therefore, the long sheet material wound up onto a roll can be directly packaged and delivered, while conventionally a long sheet material is stamped and the stamped sheet material is packaged most carefully and delivered to an optical display device processing manufacturer.

Patent Document 1: Japanese Unexamined Patent Publication Laid-open No. 2007-140046

DISCLOSURE OF THE INVENTION

Problems to be Solved by the Invention

However, according to the system for manufacturing an optical display device disclosed in Patent Document 1, when a different product is manufactured by changing the kind of optical display units (that is, at the time of exchanging categories), it is a general practice to stop temporarily the feeding of previous optical display units and to continue bonding the optical films of the previous category until the optical display units of the previous category are used up. In this case, at the time when the optical display units of the previous category are used up, the optical films of the previous category fed from the roll and before being bonded will remain inside the manufacturing system, thereby necessitating removal of the remaining optical films of the previous category at the time of manufacturing next products (latter category). Further, it is a general practice to discard the removed optical films that have been cut (which may hereinafter be referred to as "chip products") because it is difficult to place those removed optical films in the manufacturing system again.

On the other hand, according to the manufacturing system disclosed in Patent Document 1, a higher production efficiency can be obtained when the system includes both of a line for bonding an optical film onto one surface of an optical display unit and a line for bonding an optical film onto the other surface of the optical display unit. However, according to this system, the chip products to be bonded will remain on both sides, so that the number thereof may become 70 sheets or more in total, depending on the length of each line.

Therefore, an object of the present invention is to provide a method and a system for manufacturing an optical display device that can reduce the number of optical films of a previous category remaining in the device at the time of exchanging categories.

Means for Solving the Problems

The object mentioned above can be achieved by the invention described the following.

In other words, a method for manufacturing an optical display device of the present invention relates to a method for manufacturing an optical display device in which an optical film is bonded to an optical display unit, comprising:
  wherein a bonding step of drawing a long sheet material having an optical film out from a roll on which the long sheet material is wound up and, while feeding after cutting into a predetermined length, bonding the optical film onto one surface of the optical display unit that is successively fed; and
  a roll exchanging step of exchanging a roll of a previous category for a roll of a latter category and joining the optical films of the previous category and the latter category at the time of exchanging categories,
  wherein the bonding step is stopped and the roll exchanging step is performed when the number X of remaining sheets of the optical display units of the previous category prior to bonding becomes substantially equal to the number N at the time of exchanging categories, assuming that the number of optical display units that are bonded substantially in correspondence with the optical films that are present from a joining position of the optical film to a bonding position of the optical film is N.

According to the method for manufacturing an optical display device of the present invention, the bonding step is stopped and the roll exchanging step is performed when the number X of remaining sheets prior to bonding becomes substantially equal to the number N. Therefore, the number of optical display units remaining at that time point almost corresponds to the length of the optical film on the downstream side of the joining position. For this reason, when the step of bonding the previous category is finished, only the optical display units of the latter category and the optical film of the latter category are present within the device, thereby reducing the number of optical films of the previous category remaining within the device at the time of exchanging categories.

Also, a method for manufacturing an optical display device of the present invention relates to a method for manufacturing an optical display device in which optical films are bonded to an optical display unit, comprising:
  a first bonding step of drawing a long sheet material having a first optical film out from a first roll on which the long sheet material is wound up and, while feeding after cutting into a predetermined length, bonding the first optical film onto one surface of the optical display unit that is successively fed;
  a second bonding step of drawing a long sheet material having a second optical film out from a second roll on which the long sheet material is wound up and, while feeding after cutting into a predetermined length, bonding the second optical film onto the other surface of the optical display unit that is successively fed;
  a first roll exchanging step of exchanging a first roll of a previous category for a first roll of a latter category and joining the first optical films of the previous category and the latter category at the time of exchanging categories; and
  a second roll exchanging step of exchanging a second roll of a previous category for a second roll of a latter category and joining the second optical films of the previous category and the latter category at the time of exchanging categories,
  wherein the first bonding step or the second bonding step is stopped and the first roll exchanging step or the second roll exchanging step corresponding thereto is performed when the number X of remaining sheets of the optical display units of the previous category prior to bonding becomes substantially equal to the number $N_1$ or substantially equal to the number $N_2$ at the time of exchanging categories,
  assuming that the number of optical display units that are bonded substantially in correspondence with the first optical films that are present from a joining position of the first optical film to a bonding position of the first optical film is $N_1$, and
  that the number of optical display units that are bonded substantially in correspondence with the second optical films that are present from a joining position of the second optical film to a bonding position of the second optical film is $N_2$.

According to the method for manufacturing an optical display device of the present invention, at least one of the bonding steps is stopped and a corresponding roll exchanging step is performed when the number X of remaining sheets prior to bonding becomes substantially equal to the number $N_1$ or the number $N_2$. Therefore, the number of optical display units remaining at that time point almost corresponds to the length of the optical film on the downstream side of the joining position. For this reason, when the step of bonding the previous category is finished, only the optical display units of the latter category and the optical film of the latter category are present within the device, thereby reducing the number of optical films of the previous category remaining within the device at the time of exchanging categories.

Also, a method for manufacturing an optical display device of the present invention relates to a method for manufacturing an optical display device in which optical films are bonded to an optical display unit, comprising:

a first bonding step of drawing a long sheet material having a first optical film out from a first roll on which the long sheet material is wound up and, while feeding after cutting into a predetermined length, bonding the first optical film onto one surface of the optical display unit that is successively fed;

a second bonding step of drawing a long sheet material having a second optical film out from a second roll on which the long sheet material is wound up and, while feeding after cutting into a predetermined length, bonding the second optical film onto the other surface of the optical display unit that is successively fed;

a first roll exchanging step of exchanging a first roll of a previous category for a first roll of a latter category and joining the first optical films of the previous category and the latter category at the time of exchanging categories; and a second roll exchanging step of exchanging a second roll of a previous category for a second roll of a latter category and joining the second optical films of the previous category and the latter category at the time of exchanging categories, wherein, when N1 is larger than N2, the first bonding step and the second bonding step are stopped and the first roll exchanging step is performed when the number X of remaining sheets of the optical display units of the previous category prior to bonding becomes substantially equal to the number N1; the first bonding step and the second bonding step are started again; and the first bonding step and the second bonding step are stopped and the second roll exchanging step is performed when the number X of remaining sheets of the optical display units of the previous category prior to bonding becomes substantially equal to the number N2 at the time of exchanging categories, and when N1 is smaller than N2, the first bonding step and the second bonding step are stopped and the second roll exchanging step is performed when the number X of remaining sheets of the optical display units of the previous category prior to bonding becomes substantially equal to the number N2; the first bonding step and the second bonding step are started again; and the first bonding step and the second bonding step are stopped and the first roll exchanging step is performed when the number X of remaining sheets of the optical display units of the previous category prior to bonding becomes substantially equal to the number N1 at the time of exchanging categories, and when N1 is substantially equal to N2, the first bonding step and the second bonding step are stopped and the first roll exchanging step and the second roll exchanging step are performed when the number X of remaining sheets of the optical display units of the previous category prior to bonding becomes substantially equal to the number N1 or substantially equal to the number N2 at the time of exchanging categories, assuming that the number of optical display units that are bonded substantially in correspondence with the first optical films that are present from a joining position of the first optical film to a bonding position of the first optical film is N1, and that the number of optical display units that are bonded substantially in correspondence with the second optical films that are present from a joining position of the second optical film to a bonding position of the second optical film is N2.

According to the method for manufacturing an optical display device of the present invention, the bonding step is stopped and a corresponding optical film roll exchanging step is performed when the number X of remaining sheets prior to bonding becomes substantially equal to the number N1 or the number N2, whichever is larger. Therefore, the number of optical display units remaining at that time point almost corresponds to the length of the optical films of the roll on the downstream side of the joining position. Subsequently, the bonding step is started again, and then the bonding step is stopped and a corresponding optical film roll exchanging step is performed when the number X of remaining sheets prior to bonding becomes substantially equal to the number N1 or the number N2, whichever is smaller. Therefore, the number of optical display units remaining at that time point almost corresponds to the length of the optical films of the roll on the downstream side of the joining position. For this reason, when the step of bonding the previous category is finished, only the optical display units of the latter category and the first and second optical films of the latter category are present within the device, thereby reducing the number of optical films of the previous category remaining within the device at the time of exchanging categories.

Also, it is preferable to feed successively the optical display units of the latter category subsequently to the optical display units of the previous category. By this method, bonding of the optical display units of the latter category can be carried out immediately after bonding of the optical display units of the previous category is finished, whereby the manufacturing efficiency can be further enhanced.

On the other hand, a system for manufacturing an optical display device of the present invention relates to a system for manufacturing an optical display device in which an optical film is bonded to an optical display unit, comprising:

an optical display unit feeding apparatus that successively feeds optical display units;

an optical film feeding apparatus that draws a long sheet material having an optical film out from a roll on which the long sheet material is wound up and, after cutting into a predetermined length, feeds the long sheet material;

a bonding apparatus that bonds the optical film fed from the optical film feeding apparatus onto a surface of the optical display unit fed from the optical display unit feeding apparatus; and a controller that operates or stops each of the apparatuses, wherein the optical film feeding apparatus has a roll exchanging section for exchanging a roll of a previous category for a roll of a latter category and joining the optical films of the previous category and the latter category at the time of exchanging categories, the optical display unit feeding apparatus has a counting section that counts the number of feeding of the optical display units, and the controller stores the number N of optical display units that are bonded substantially in correspondence with the optical films that are present from a joining position of the optical film to a bonding position of the optical film, and stops each of the apparatuses when the number X of remaining sheets of the optical display units of the previous category prior to bonding becomes substantially equal to the number N at the time of exchanging categories based on information from the counting section.

According to the system for manufacturing an optical display device of the present invention, the optical display unit feeding apparatus has a counting section that counts the number of feeding, and the controller stops each apparatus when the number X of remaining sheets prior to bonding becomes substantially equal to the number N based on the information from the counting section. Therefore, the rolls can be exchanged at the roll exchanging section, and the number of optical display units remaining at that time point almost corresponds to the length of the optical film on the downstream side of the joining position. For this reason, when the step of bonding the optical display units of the previous category is finished, only the optical display units of the latter category and the optical film of the latter category are present within the device, thereby reducing the number of optical films of the previous category remaining within the device at the time of exchanging categories.

Also, a system for manufacturing an optical display device of the present invention relates to a system for manufacturing an optical display device in which optical films are bonded to an optical display unit, comprising:
  an optical display unit feeding apparatus that successively feeds optical display units;
  a first optical film feeding apparatus that draws a long sheet material having a first optical film out from a first roll on which the long sheet material is wound up and, after cutting into a predetermined length, feeds the long sheet material;
  a first bonding apparatus that bonds the first optical film fed from the first optical film feeding apparatus onto one surface of the optical display unit fed from the optical display unit feeding apparatus;
  a feeder that carries and feeds the optical display unit after the first optical film is bonded;
  a second optical film feeding apparatus that draws a long sheet material having a second optical film out from a second roll on which the long sheet material is wound up and, after cutting into a predetermined length, feeds the long sheet material;
  a second bonding apparatus that bonds the second optical film fed from the second optical film feeding apparatus onto the other surface of the optical display unit fed from the feeder; and
  a controller that operates or stops each of the apparatuses, wherein
  the first optical film feeding apparatus has a first roll exchanging section for exchanging a first roll of a previous category for a first roll of a latter category and joining the first optical films of the previous category and the latter category at the time of exchanging categories,
  the second optical film feeding apparatus has a second roll exchanging section for exchanging a second roll of a previous category for a second roll of a latter category and joining the second optical films of the previous category and the latter category at the time of exchanging categories,
  the optical display unit feeding apparatus has a counting section that counts the number of feeding of the optical display units,
  the controller stores the number $N_1$ of optical display units that are bonded substantially in correspondence with the first optical films that are present from a joining position of the first optical film to a bonding position of the first optical film, and stores the number $N_2$ of optical display units that are bonded substantially in correspondence with the second optical films that are present from a joining position of the second optical film to a bonding position of the second optical film, and
  the controller stops each of the apparatuses when the number X of remaining sheets of the optical display units of the previous category prior to bonding becomes substantially equal to the number $N_1$ or the number $N_2$ at the time of exchanging categories based on information from the counting section.

According to the system for manufacturing an optical display device of the present invention, the optical display unit feeding apparatus has a counting section that counts the number of feeding, and the controller stops each apparatus when the number X of remaining sheets prior to bonding becomes substantially equal to the number $N_1$ or the number $N_2$ based on the information from the counting section. Therefore, the rolls can be exchanged at the roll exchanging section, and the number of optical display units remaining at that time point almost corresponds to the length of the optical film on the downstream side of the joining position for any one of the optical films. For this reason, when the step of bonding the optical display units of the previous category is finished, only the optical display units of the latter category and the optical film of the latter category are present within the device, thereby reducing the number of optical films of the previous category remaining within the device at the time of exchanging categories.

Also, a system for manufacturing an optical display device of the present invention relates to a system for manufacturing an optical display device in which optical films are bonded to an optical display unit, comprising:
  an optical display unit feeding apparatus that successively feeds optical display units;
  a first optical film feeding apparatus that draws a long sheet material having a first optical film out from a first roll on which the long sheet material is wound up and, after cutting into a predetermined length, feeds the long sheet material;
  a first bonding apparatus that bonds the first optical film fed from the first optical film feeding apparatus onto one surface of the optical display unit fed from the optical display unit feeding apparatus;
  a feeder that carries and feeds the optical display unit after the first optical film is bonded;
  a second optical film feeding apparatus that draws a long sheet material having a second optical film out from a second roll on which the long sheet material is wound up and, after cutting into a predetermined length, feeds the long sheet material;
  a second bonding apparatus that bonds the second optical film fed from the second optical film feeding apparatus onto the other surface of the optical display unit fed from the feeder; and
  a controller that operates or stops each of the apparatuses, wherein
  the first optical film feeding apparatus has a first roll exchanging section for exchanging a first roll of a previous category for a first roll of a latter category and joining the first optical films of the previous category and the latter category at the time of exchanging categories,
  the second optical film feeding apparatus has a second roll exchanging section for exchanging a second roll of a previous category for a second roll of a latter category and joining the second optical films of the previous category and the latter category at the time of exchanging categories, the optical display unit feeding apparatus has a counting section that counts the number of feeding of the optical display units, the controller stores the number N1 of optical display units that are bonded substantially in correspondence with the first optical films that are present from a joining position of the first optical film to a bonding position of the first optical film, and stores the number N2 of optical display units that are bonded substantially in correspondence with the second optical films that are present from a joining position of the second optical film to a bonding position of the second optical film, and the controller stops each of the apparatuses when the number X of remaining sheets of the optical display units of the previous category prior to bonding becomes substantially equal to the number N1 or the number N2, whichever is larger, and after operating each of the apparatuses, stops each of the apparatus when the number X of remaining sheets of the optical display units prior to bonding becomes substantially equal to the number N1 or the number N2, whichever is smaller, at the time of exchanging categories based on information from the counting section.

According to the system for manufacturing an optical display device of the present invention, the optical display unit feeding apparatus has a counting section that counts the number of feeding, and the controller stops each apparatus when the number X of remaining sheets prior to bonding becomes substantially equal to the number N1 or the number N2, whichever is larger, based on the information from the counting section. Therefore, the rolls can be exchanged at the roll exchanging section, and the number of optical display units remaining at that time point almost corresponds to the length of the optical film of the roll on the downstream side of the joining position. Subsequently, the bonding is started again, and then the bonding step is stopped and a corresponding optical film roll exchanging step is performed when the number X of remaining sheets prior to bonding becomes substantially equal to the number N1 or the number N2, whichever is smaller. Therefore, the number of optical display units remaining at that time point almost corresponds to the length of the optical film of the roll on the downstream side of the joining position. For this reason, when the step of bonding the optical display units of the previous category is finished, only the optical display units of the latter category and the first and second optical films of the latter category are present within the device, thereby reducing the number of optical films of the previous category remaining within the device at the time of exchanging categories.

Also, it is preferable that the controller receive, at some time point in advance, an input of the number X0 of remaining sheets of the optical display units of the previous category prior to bonding at the time of exchanging categories, and calculate the number X based on this number X0 and the information from the counting section. By input of the number X0 of remaining sheets in advance in this manner, the number X of remaining sheets prior to bonding can be calculated more accurately based on this number X0 and the information from the counting section.

DESCRIPTION OF REFERENCE SYMBOLS

Figure 1:
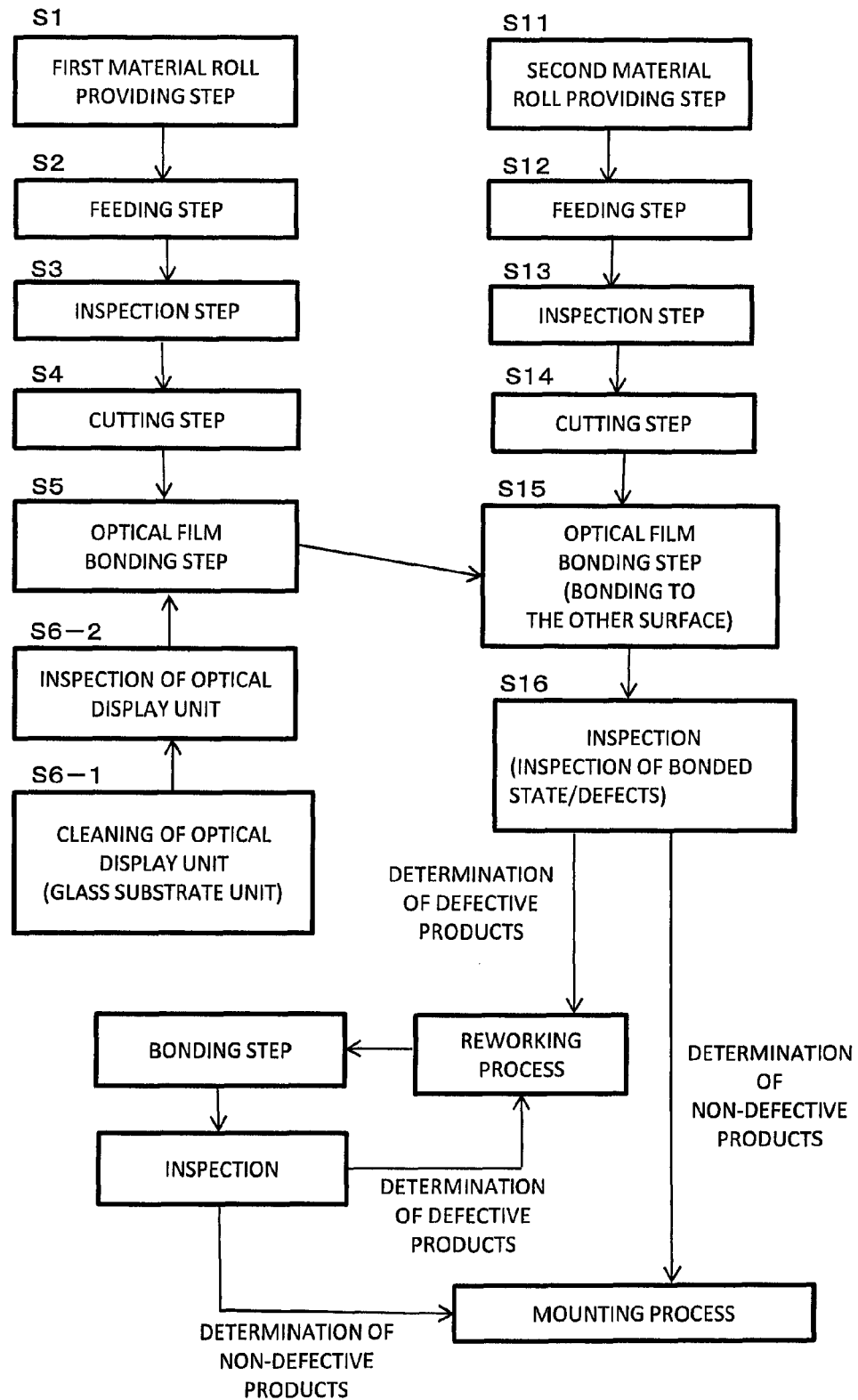
FIG. 1 is a flowchart showing steps according to a manufacturing system of the present invention.

F1 first sheet material
F2 second sheet material
F11 first optical film
F11a first polarizer
F11b first film
F11c second film
F12 first release film
F13 surface protecting film
F14 first pressure-sensitive adhesive layer
F21 second optical film
F21a second polarizer
F21b third film
F21c fourth film
F22 second release film
F23 surface protecting film
F24 second pressure-sensitive adhesive layer
M1 apparatus for feeding optical display unit
M2 apparatus for feeding first optical film
M3 first bonding apparatus
M4 feeder
M5 apparatus for feeding second optical film
M6 second bonding apparatus
1 controller
12 first feeder
14 first defect inspection apparatus
16 first cutting apparatus
17 first peeling apparatus
18 first bonding apparatus
19 first rejection apparatus
20 turning mechanism
22 second feeder
24 second defect inspection apparatus
26 second cutting apparatus
27 second peeling apparatus
28 second bonding apparatus
29 second rejection apparatus
W optical display unit

BEST MODES FOR CARRYING OUT THE INVENTION

Figure 2:
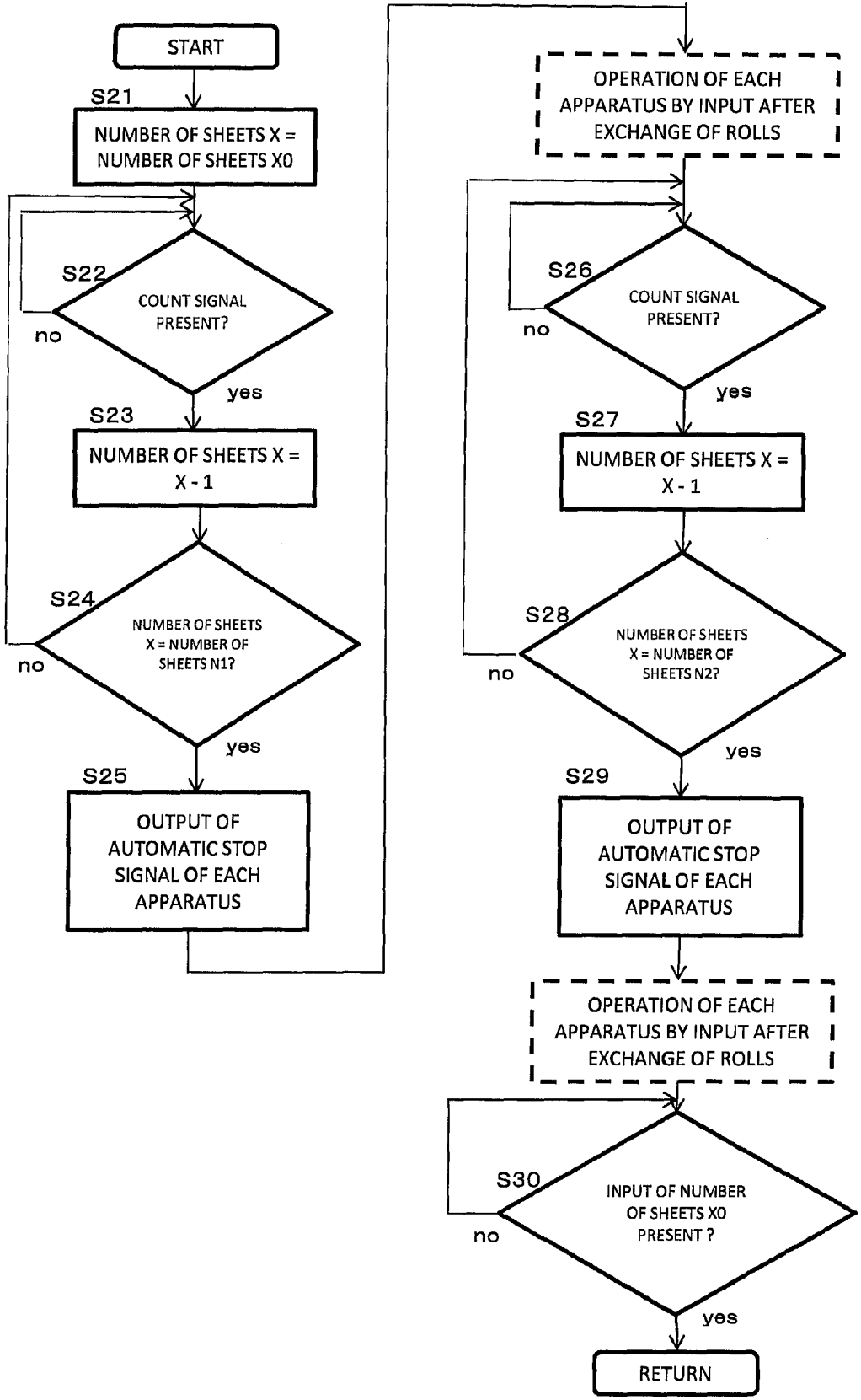
FIG. 2 is a flowchart showing a program of a controller of the manufacturing system of the present invention.
Figure 3:
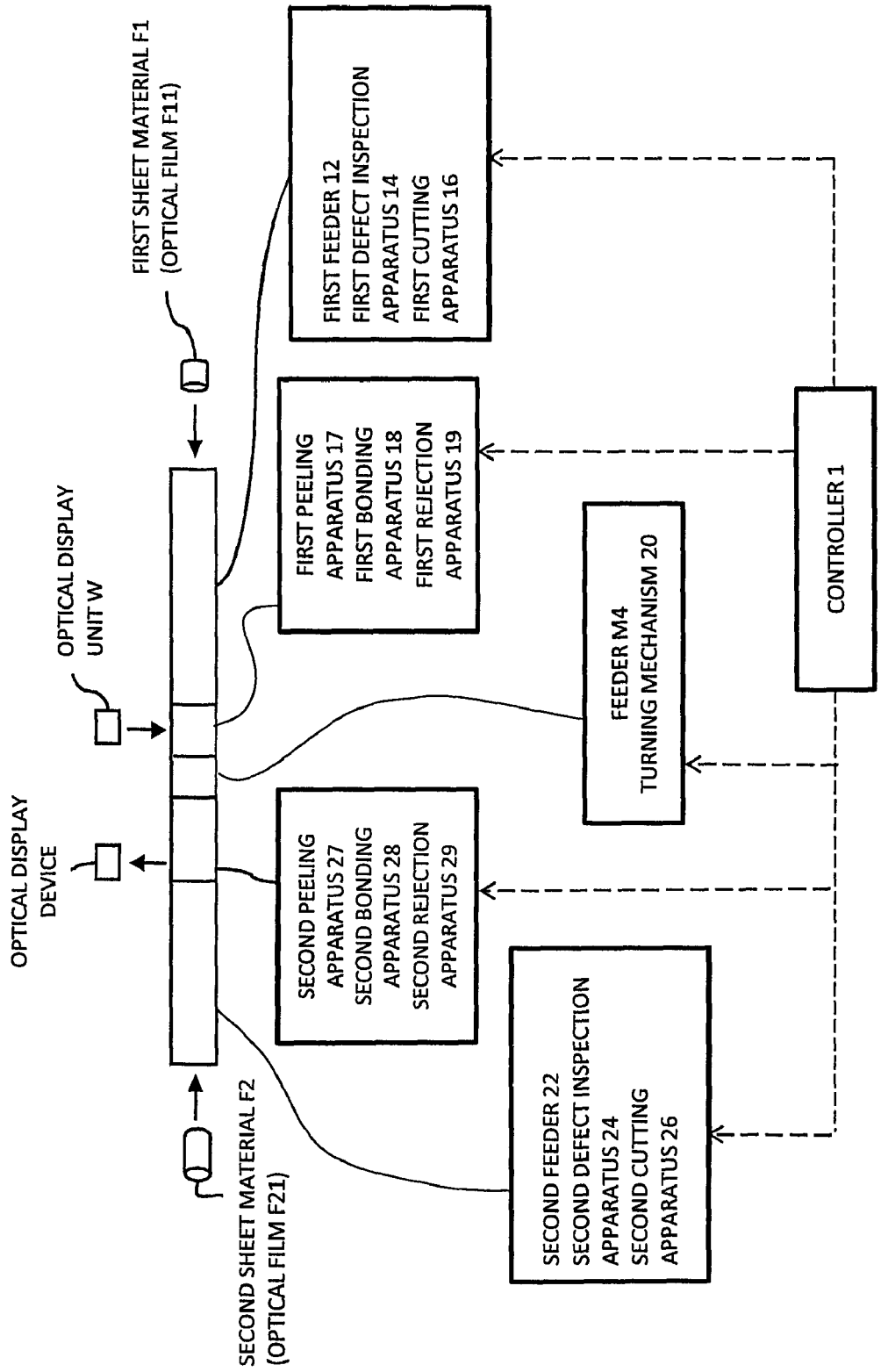
FIG. 3 is a view for describing one example of the manufacturing system of the present invention.
Figure 4:
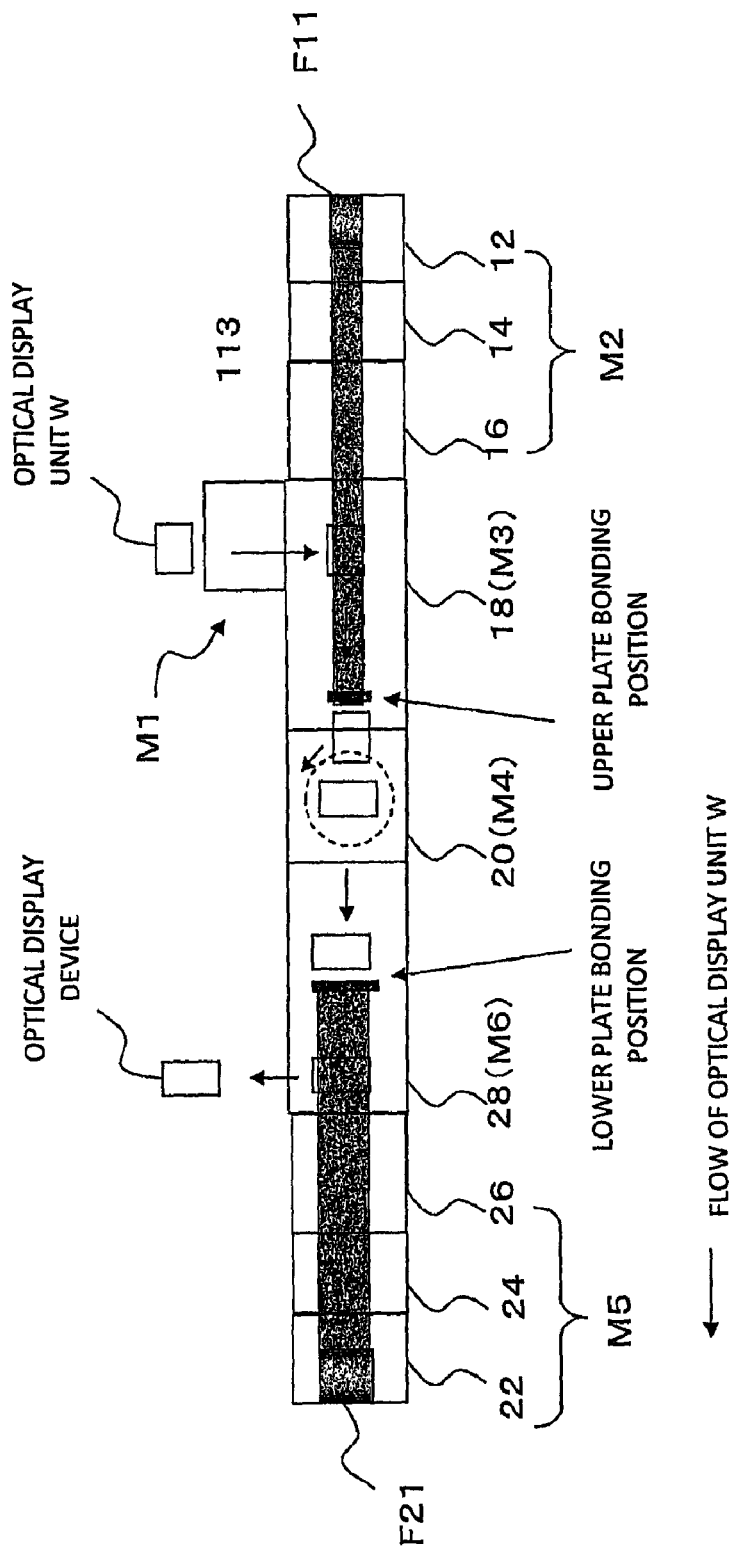
FIG. 4 is a view for describing one example of the manufacturing system of the present invention.

Hereafter, embodiments of the present invention will be described in the order of source materials used in the system for manufacturing an optical display device, a flow of manufacturing steps, and configuration of each section of the manufacturing system. FIG. 1 shows one example of a flowchart of a method for manufacturing the optical display device. FIG. 2 shows one example of a flowchart of a program in a controller of the system for manufacturing the optical display device. FIG. 3 shows a configuration view of one example of the system for manufacturing the optical display device. FIG. 4 shows a plan arrangement view of one example of the system for manufacturing the optical display device.

(Optical Display Unit)

First, examples of the optical display unit used in the present invention include a glass substrate unit of a liquid crystal cell and an organic electroluminescent (EL) light-emitting unit. The present invention is effective for an optical display unit having a rectangular outer shape, and those with the ratio of longer side/shorter side=16/9 or 4/3 are used, for example.

(Optical Film)

Examples of the optical film bonded to the optical display unit include an optical film including a polarizing plate, and a polarizing plate, an optical film obtained by laminating a retardation film, a brightness enhancement film, or a combination of two or more of these films on a polarizing plate, or the like may be exemplified. In some cases, a transparent film for protection may be laminated on the surface of these optical films. Also, on one surface of the optical film, a pressure-sensitive adhesive layer is preferably formed so that the optical film may be bonded to the optical display unit, for example. A release film is provided for protecting this pressure-sensitive adhesive layer. Also, on the other surface of the optical film, a surface protecting film is provided with a pressure-sensitive adhesive layer interposed therebetween, for example. In the following, an optical film on which a surface protecting film and a release film are laminated may be referred to as a sheet material.

(Production Flowchart)

A method for manufacturing an optical display device of the present invention is a method for manufacturing an optical display device in which an optical film is bonded to an optical display unit, and includes a bonding step of drawing a long sheet material having an optical film out from a roll on which the long sheet material is wound up and, while feeding after cutting into a predetermined length, bonding the optical film onto one surface of the optical display unit that is successively fed. In the present invention, the optical film can be bonded onto one surface or onto both surfaces of the optical display unit.

In the present embodiment, an example will be shown which includes a first bonding step of drawing a long sheet material having a first optical film out from a roll on which the long sheet material is wound up and, while feeding after cutting into a predetermined length, bonding the first optical film onto one surface of the optical display unit, and a second bonding step of drawing a long sheet material having a second optical film out from a roll on which the long sheet material is wound up and, while feeding after cutting into a predetermined length, bonding the second optical film onto the other surface of the optical display unit.

The first bonding step is performed, for example, by (2) the feeding step to (5) the first optical film bonding step that will be described in the following, and the second bonding step is performed, for example, by (8) the feeding step to (11) the second optical film bonding step that will be described in the following.

(1) First Material Roll Providing Step (FIG. 1, S1)

A long first sheet material is provided as a first material roll. The width of the first material roll depends on the bonding size of the optical display unit. Specifically, the width of the first material roll is determined in correspondence with one of the long side and the short side of the optical display unit, and the width of a second material roll is determined in correspondence with the other of the long side and the short side of the optical display unit. For this reason, the first material roll and the second material roll differ in width.

Figure 5:
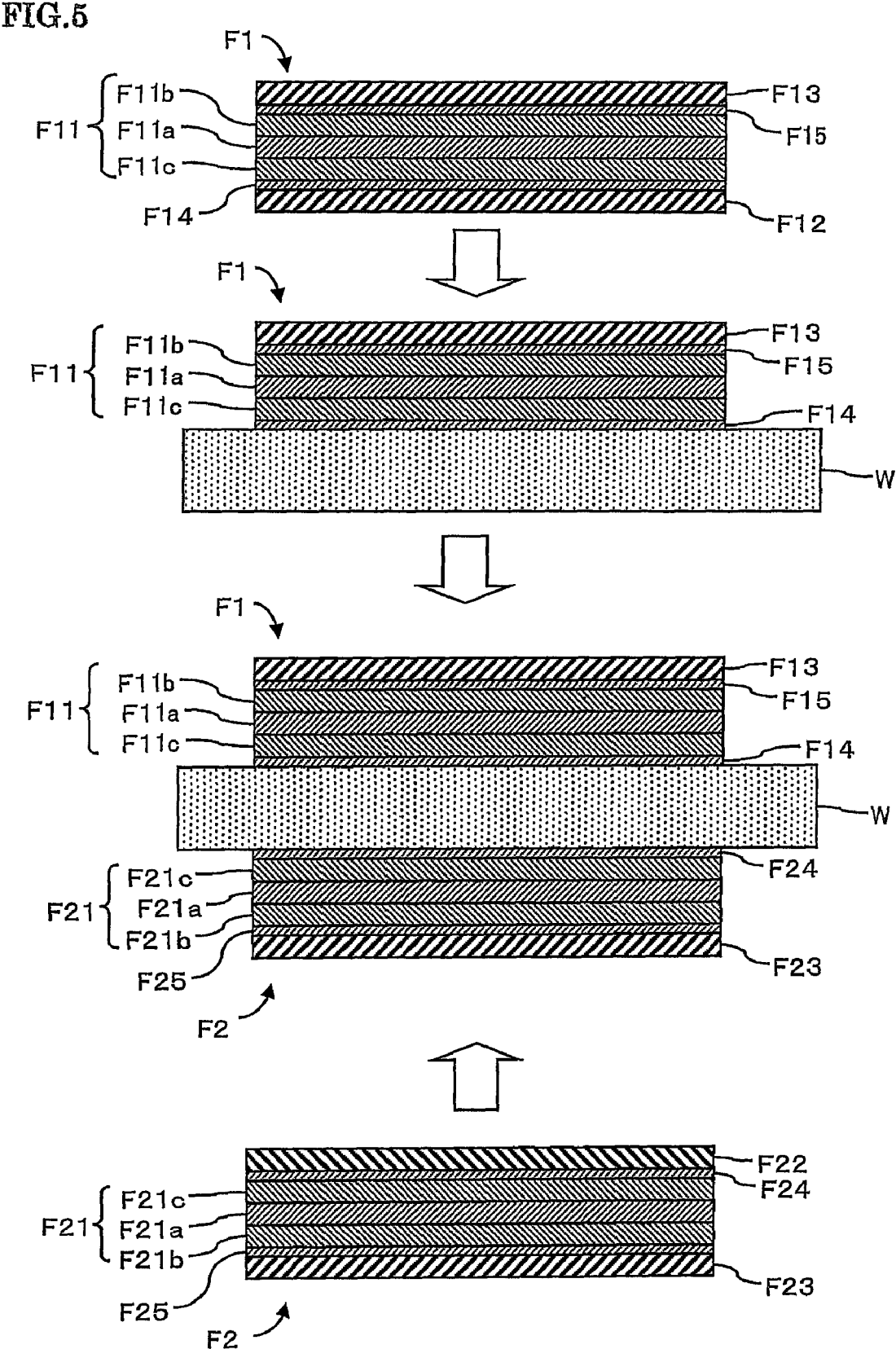
FIG. 5 is a view for describing one example of a lamination structure of first and second optical films.
Figure 6:
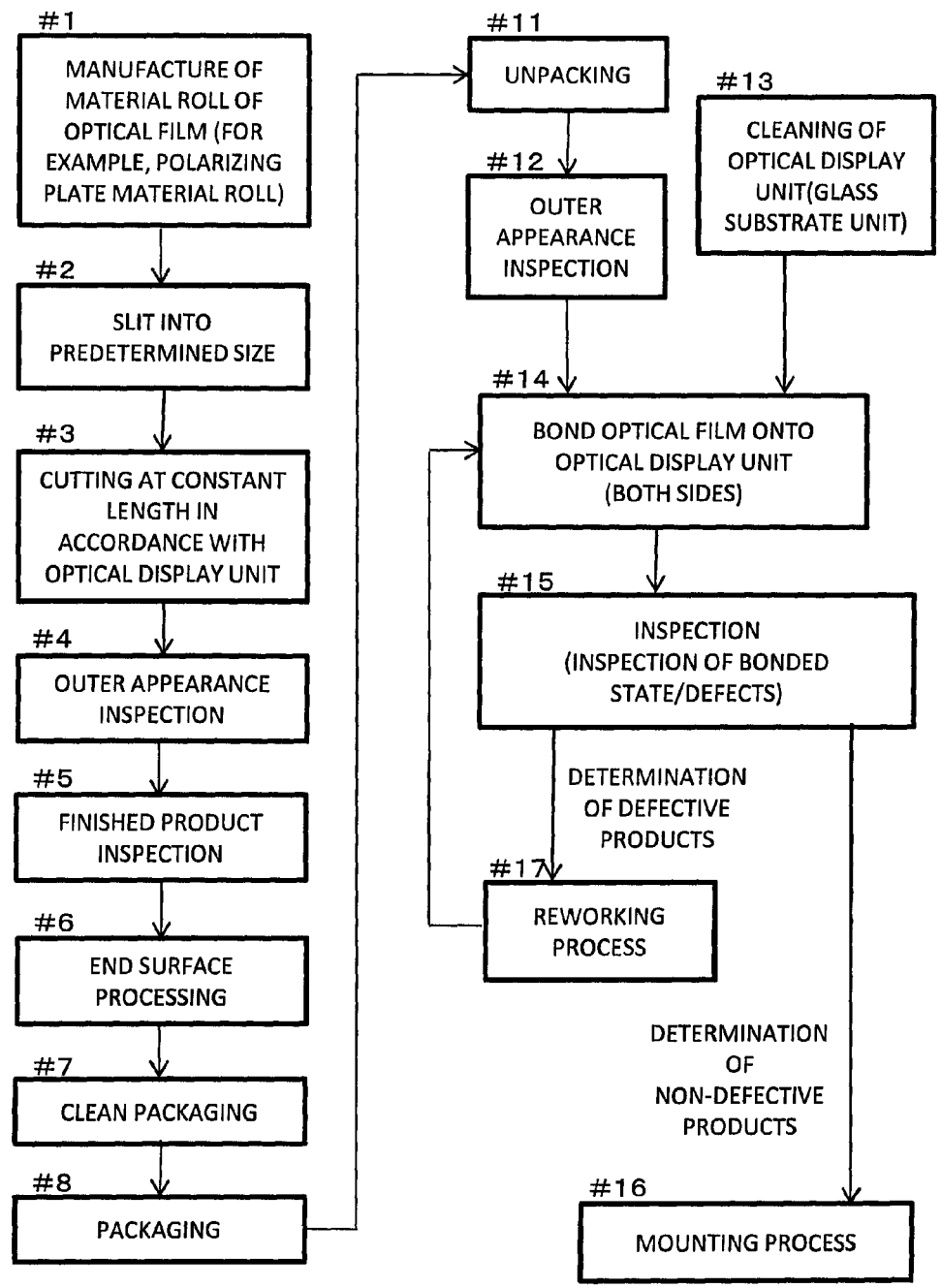
FIG. 6 is a flowchart of a method for manufacturing a conventional optical display device.

As shown in FIG. 5, for example, the lamination structure of a first sheet material F1 has a first optical film F11, a first release film F12, and a surface protecting film F13. The first optical film F11 is configured with a first polarizer F11a, a first film F11b disposed on one surface thereof with an adhesive layer (not illustrated) interposed therebetween, and a second film F11c disposed on the other surface thereof with an adhesive layer (not illustrated) interposed therebetween.

The first and second films F11b and F11c are, for example, a polarizer protecting film (for example, a triacetylcellulose film, a PET film, or the like). The second film F11c is bonded on the optical display unit surface side with a first pressure-sensitive adhesive layer F14 interposed therebetween. The first film F11b may be subjected to a surface treatment. The surface treatment may be, for example, hard coating, an anti-reflection treatment, a treatment performed for the purpose of prevention or diffusion of sticking or anti-glare, or the like. The first release film F12 is disposed with the second film F11c and the first pressure-sensitive adhesive layer F14 interposed therebetween. Also, the surface protecting film F13 is disposed with the first film F11b and a pressure-sensitive adhesive layer F15 interposed therebetween. Specific configurations of the first and second films F11b and F11c will be described later. In the following, a lamination structure of a polarizer and a polarizer protecting film will be referred to as a polarizing plate.

Each of the following steps is carried out within an isolated equipment isolated in a factory, and a cleanliness is maintained. In particular, the cleanliness is preferably maintained in a bonding step of bonding an optical film onto an optical display unit.

(2) Feeding Step (FIG. 1, S2)

A first sheet material F1 is drawn out from the provided and placed first material roll, and fed to the downstream side. The first feeder 12 that feeds the first sheet material F1 is configured, for example, with a pair of nip rollers. a tension roller, a rotary drive, an accumulator, a sensor, a controller, and others.

(3) First Inspection Step (FIG. 1, S3)

The defects of the first sheet material F1 are inspected by using a first defect inspection apparatus 14. The defect inspection method used herein may be, for example, a method of imaging and image processing by transmitted light or reflected light on both surfaces of the first sheet material F1, a method of imaging and image processing by placing a polarizing film for inspection between a CCD camera and an object of inspection so as to be in crossed nicols relation with the polarization axis of the polarizing plate serving as the object of inspection (which may be referred to as 0 degree cross), or a method of imaging and image processing by placing a polarizing film for inspection between a CCD camera and an object of inspection so as to form a predetermined angle (for example, a range larger than 0 degree and within 10 degrees) with the polarization axis of the polarizing plate serving as the object of inspection (which may be referred to as x degree cross). Here, a known method can be applied to the algorithm of image processing, and the defects can be detected through grayscale determination by binarization.

In the imaging and image processing by transmitted light, the contaminant inside the first sheet material F1 can be detected. In the imaging and image processing by reflected light, the adherent contaminant on the first sheet material F1 surface can be detected. In the imaging and image processing by 0 degree cross, mainly the surface contaminant, the stain, the contaminant in the inside, and the like can be detected as bright spots. In the imaging and image processing by x degree cross, mainly the knicks can be detected.

The information on the defects obtained in the first defect inspection apparatus 14 is transmitted to the controller 1 while being associated with the position information (for example, position coordinates) thereof, and can be made to contribute to a later-mentioned cutting method by a first cutting apparatus 16.

(4) First Cutting Step (FIG. 1, S4)

The first cutting apparatus 16 cuts the surface protecting film F13, the pressure-sensitive adhesive layer F15, the first optical film F11, and the first pressure-sensitive adhesive layer F14 into a predetermined size without cutting the first release film F12. As a result, the first release film F12 can be used as a carrying medium of the first optical film F11. In other words, in the present invention, it is preferable that the first optical film F11 and the second optical film F21 be carried and supplied respectively to the first bonding step and the second bonding step by using, as a carrying medium, the release film formed on the optical film with the pressure-sensitive adhesive layer interposed therebetween.

The cutting length is made to correspond, for example, to one of the long and short sides of the optical display unit. When the width of the first material roll corresponds to the short side, the optical film is cut by the length corresponding to the long side. Alternatively, when the width of the first material roll corresponds to the long side, the optical film is cut by the length corresponding to the short side. In the present embodiment, as shown in FIG. 4, an example is shown in which the width of the first material roll (first sheet material F1) corresponds to the short side of the optical display unit W.

The cutting means may be, for example, laser, a cutter, other known cutting means, or the like. It is configured such that the cutting is made so as to avoid the defects based on the information on the defects obtained in the first defect inspection apparatus 14. This greatly enhances the yield ratio of the first sheet material F1. It is configured such that the first sheet material F1 containing defects is rejected by a later-mentioned first rejection apparatus 19, and is not bonded to the optical display unit W. In other words, in the present invention, in feeding the first optical film F11 and the second optical film F21, it is preferable to include a defective part rejecting step of cutting and rejecting the parts of the optical film having defects.

(5) First Optical Film Bonding Step (FIG. 1, S5)

While removing the first release film F12 by using a first peeling apparatus 17, the first optical film F11 from which the first release film F12 has been removed is bonded to the optical display unit W with the first pressure-sensitive adhesive layer F14 interposed therebetween by using the first bonding apparatus 18. In bonding, the first optical film F11 and the optical display unit W are press-bonded by being sandwiched between a pair of rolls, as will be described later.

(6-1) Cleaning Step (FIG. 1, S6-1)

The surface of the optical display unit W is cleaned by polishing cleaning, water cleaning, or the like. The cleaned optical display unit W is conveyed to an inspection apparatus.

(6-2) Inspection Step (FIG. 1, S6-2)

The surface of the cleaned optical display unit W is inspected by the inspection apparatus. The inspected optical display unit W is conveyed to the first bonding apparatus 18.

The respective steps of these first material roll providing step, first inspection step, first cutting step, first optical film bonding step, cleaning step, and inspection step are preferably on a consecutive production line. In the series of production steps described above, the first optical film F11 is bonded onto one surface of the optical display unit W. In the following, a production step of bonding the second optical film F21 onto the other surface will be described.

(1) Second Material Roll Providing Step (FIG. 1, S11)

A long second sheet material F2 is provided as a second material roll. As shown in FIG. 5, the lamination structure of the second sheet material F2 has the same configuration as the first sheet material; however, the lamination structure is not limited to this alone. The second sheet material F2 has a second optical film F21, a second release film F22, and a surface protecting film F23. The second optical film F21 is configured with a second polarizer F21a, a third film F21b disposed on one surface thereof with an adhesive layer (not illustrated) interposed therebetween, and a fourth film F21c disposed on the other surface thereof with an adhesive layer (not illustrated) interposed therebetween.

The third and fourth films F21b, F21c are, for example, a polarizer protecting film (for example, a triacetylcellulose film, a PET film, or the like). The fourth film F21c is bonded on the optical display unit W surface side with a second pressure-sensitive adhesive layer F24 interposed therebetween. The third film F21b may be subjected to a surface treatment. The surface treatment may be, for example, hard coating, an anti-reflection treatment, a treatment performed for the purpose of prevention or diffusion of sticking or anti-glare, or the like. The second release film F22 is disposed with the fourth film F21c and the second pressure-sensitive adhesive layer F24 interposed therebetween. Also, the surface protecting film F23 is disposed with the third film F21b and a pressure-sensitive adhesive layer F25 interposed therebetween.

(8) Feeding Step (FIG. 1, S12)

A second sheet material F2 is drawn out from the provided and placed second material roll, and fed to the downstream side. The second feeder 22 that feeds the second sheet material is configured, for example, with a pair of nip rollers, a tension roller, a rotary drive, an accumulator, a sensor, a controller, and others.

(9) Second Inspection Step (FIG. 1, S13)

The defects of the second sheet material F2 are inspected by using a second defect inspection apparatus 24. The defect inspection method used herein is the same as the above-described method by the first defect inspection apparatus.

(10) Second Cutting Step (FIG. 1, S14)

A second cutting apparatus 26 cuts the surface protecting film F23, the pressure-sensitive adhesive layer F25, the second optical film F21, and the second pressure-sensitive adhesive layer F24 into a predetermined size without cutting the second release film F22. Specifically, the cutting is made to correspond, for example, to one of the long and short sides of the optical display unit W. When the width of the second material roll corresponds to the short side, the optical film is cut by the length corresponding to the long side. Alternatively, when the width of the second material roll corresponds to the long side, the optical film is cut by the length corresponding to the short side. In the present embodiment, as shown in FIG. 4, an example is shown in which the width of the second material roll (second sheet material F2) corresponds to the long side of the optical display unit W.

The cutting means may be, for example, laser, a cutter, other known cutting means, or the like. It is configured such that the cutting is made so as to avoid the defects based on the information on the defects obtained in the second defect inspection apparatus 24. This greatly enhances the yield ratio of the second sheet material F2. It is configured such that the second sheet material F2 containing defects is rejected by a later-mentioned second rejection apparatus 29, and is not bonded to the optical display unit W.

(11) Second Optical Film Bonding Step (FIG. 1, S15)

Subsequently, after the second cutting step, while removing the second release film F22 by using a second peeling apparatus 27, the second optical film F21 from which the second release film F22 has been removed is bonded to the surface of the optical display unit W that is different from the surface on which the first optical film F11 has been bonded, with the second pressure-sensitive adhesive layer F24 interposed therebetween by using the second bonding apparatus 28. Here, in some cases, before bonding the second optical film F21 onto the optical display unit W, the optical display unit W may be rotated by 90 degrees so as to let the first optical film F11 and the second optical film F21 be in a crossed nicols relation. In other words, in the present invention, it is preferable to include a turning step of turning the optical display unit W having been subjected to bonding in the first bonding step in a direction of bonding in the second bonding step. In bonding, the second optical film F21 and the optical display unit W are press-bonded by being sandwiched between rolls, as will be described later.

(12) Step of Inspecting an Optical Display Device (FIG. 1, S16)

The inspection apparatus inspects the optical display device in which an optical film has been bonded onto both surfaces of the optical display unit W. As the inspection method, a method of imaging and image processing by reflected light on both surfaces of the optical display device may be exemplified. Also, as another method, a method of placing a polarizing film for inspection between a CCD camera and an object of inspection may be exemplified. Here, a known method can be applied to the algorithm of image processing, and the defects can be detected through grayscale determination by binarization.

Determination of a non-defective optical display device is carried out based on the information on the defects obtained by the inspection apparatus. The optical display device that has been determined to be non-defective is carried to the next mounting process. When it is determined to be defective, a reworking process is carried out, whereby an optical film is newly bonded and subsequently an inspection is carried out. When it is determined to be non-defective, the procedure goes to the mounting process, whereas when it is determined to be defective, either the procedure goes to the reworking process again or the device is discarded.

In a series of production steps described above, the optical display device can be suitably manufactured by making the step of bonding the first optical film F11 and the step of bonding the second optical film F21 be on a consecutive production line.

(14) Roll Exchanging Step (not Illustrated in FIG. 1)

A method for manufacturing an optical display device of the present invention includes a roll exchanging step of exchanging a roll of a previous category for a roll of a latter category and joining the optical films of the previous category and the latter category at the time of exchanging categories. In the case of the illustrated production steps, the method includes a first roll exchanging step of exchanging a first roll of a previous category for a first roll of a latter category and joining the first optical films of the previous category and the latter category at the time of exchanging categories, and a second roll exchanging step of exchanging a second roll of a previous category for a second roll of a latter category and joining the second optical films of the previous category and the latter category at the time of exchanging categories.

Exchange of the rolls themselves can be carried out by a method such as dislocating the roll of the previous category from a roll supporting section (chuck or the like) of the apparatus that feeds the optical film and mounting the roll of the latter category.

Joining (splicing) of the optical films can be carried out, for example, by a method of allowing the end sides of the optical films to abut against each other and bonding a pressure-sensitive adhesive tape onto one surface or both surfaces, a method of superposing the end sides of the optical films onto each other at a constant width and gluing the superposed parts, a method of allowing the end sides of the optical films to abut against each other and bonding with an adhesive agent, a method of cutting while leaving only a part of each layer constituting the optical film to be long and bonding the parts with each other, or the like method.

In the present invention, the timing at which the roll exchanging step is carried out is such that the bonding step is stopped and the roll exchanging step is performed when the number X of remaining sheets of the optical display units of the previous category prior to bonding becomes substantially equal to the number N at the time of exchanging categories. Here, the number N is the number N of optical display units that are bonded substantially in correspondence with the optical films that are present from the joining position of the optical film to the bonding position of the optical film.

A method of determining this number N may be, for example, as follows. An apparatus used for manufacturing the optical display device is actually put to use, and the position of joining the optical films is marked in performing the step of bonding the optical display unit while feeding the optical film from the roll. The number N is determined by counting the number of the optical display units that have been bonded from the joining position until the mark reaches the bonding position of the optical film. However, the above-described number N may be equal to the number n of optical display units that are bonded in correspondence with the optical films that are present from the joining position of the optical film to the bonding position of the optical film, or may be the number obtained by adding a predetermined number (for example, 10% or less of the above-described number n) to the number n. This is because, when a defect is detected in the optical film fed from the roll, the number of the optical films that are actually bonded onto the optical display units may decrease by rejection of the parts containing the defects in some cases. By setting the above-described number N to be the number obtained by adding a predetermined number to the above-described number n, it is possible to prevent shortage of the optical films that are bonded in correspondence with the optical display units before the exchange of categories of the optical display units even in the case in which a part of the optical films fed from the roll is rejected.

As described above, the timing at which the roll exchanging step is carried out may be the time at which the number X of remaining sheets of the optical display units of the previous category prior to bonding becomes equal to the number n or the time at which the number X becomes equal to the number obtained by adding a predetermined number (for example, 10% or less of the above-described number n) to the number n, at the time of exchanging categories. In other words, the timing at which the roll exchanging step is carried out can be an arbitrary timing at which the number X of remaining sheets of the optical display units of the previous category prior to bonding becomes more than or equal to the number n.

In the case of the illustrated production steps, the number of optical display units that are bonded substantially in correspondence with the first optical films that are present from the joining position of the first optical film to the bonding position of the first optical film may be set to N1; the number of optical display units that are bonded substantially in correspondence with the second optical films that are present from the joining position of the second optical film to the bonding position of the second optical film may be set to N2; and these numeric values can be used. In this case, the above-described number N1 may be equal to the number n1 of optical display units that are bonded in correspondence with the first optical films that are present from the joining position of the first optical film to the bonding position of the first optical film, or may be the number obtained by adding a predetermined number (for example, 10% or less of the above-described number n1) to the number n1. Also, the above-described number N2 may be equal to the number n2 of optical display units that are bonded in correspondence with the second optical films that are present from the joining position of the second optical film to the bonding position of the second optical film, or may be the number obtained by adding a predetermined number (for example, 10% or less of the above-described number n2) to the number n2.

Also, in the illustrated manufacturing steps, the first roll exchanging step and the second roll exchanging step are carried out at the same time in some cases and at different timings in other cases depending on whether the number N1 is larger than the number N2. In other words, when N1 is larger than N2, the first bonding step and the second bonding step are stopped and the first roll exchanging step is performed when the number X of remaining sheets of the optical display units of the previous category prior to bonding becomes substantially equal to the number N1; the first bonding step and the second bonding step are started again; and the first bonding step and the second bonding step are stopped and the second roll exchanging step is performed when the number X of remaining sheets of the optical display units of the previous category prior to bonding becomes substantially equal to the number N2 at the time of exchanging categories. Here, the timing at which the first roll exchanging step is carried out may be when the number X of remaining sheets of the optical display units of the previous category prior to bonding becomes equal to the number n1 or becomes equal to the number obtained by adding a predetermined number (for example, 10% or less of the above-described number n1) to the number n1 at the time of exchanging categories. Also, the timing at which the second roll exchanging step is carried out may be when the number X of remaining sheets of the optical display units of the previous category prior to bonding becomes equal to the number n2 or becomes equal to the number obtained by adding a predetermined number (for example, 10% or less of the above-described number n2) to the number n2 at the time of exchanging categories. In other words, the timing at which the first roll exchanging step is carried out can be an arbitrary timing at which the number X of remaining sheets of the optical display units of the previous category prior to bonding becomes more than or equal to the number n1, and the timing at which the second roll exchanging step is carried out can be an arbitrary timing at which the number X of remaining sheets of the optical display units of the previous category prior to bonding becomes more than or equal to the number n2.

When N1 is smaller than N2, the first bonding step and the second bonding step are stopped and the second roll exchanging step is performed when the number X of remaining sheets of the optical display units of the previous category prior to bonding becomes substantially equal to the number N2; the first bonding step and the second bonding step are started again; and the first bonding step and the second bonding step are stopped and the first roll exchanging step is performed when the number X of remaining sheets of the optical display units of the previous category prior to bonding becomes substantially equal to the number N1 at the time of exchanging categories.

When N1 is substantially equal to N2, the first bonding step and the second bonding step are stopped and the first roll exchanging step and the second roll exchanging step are performed when the number X of remaining sheets of the optical display units of the previous category prior to bonding becomes substantially equal to the number N1 or substantially equal to the number N2 at the time of exchanging categories. The condition that "N1 is substantially equal to N2" means that the number N1 is equal to the number N2 or that, with regard to one number, the other number is equal to the number obtained by adding a predetermined number (for example, 10% or less of the aforesaid one number) to the aforesaid one number. Also, the first bonding step or the second bonding step may be stopped and the first roll exchanging step or the second roll exchanging step corresponding thereto may be performed when the number X of remaining sheets of the optical display units of the previous category prior to bonding becomes substantially equal to the number N1 or substantially equal to the number N2 at the time of exchanging categories.

The bonding apparatus and other apparatus are stopped in the first roll exchanging step or the second roll exchanging step. Here, the stoppage of these apparatuses can be carried out either manually or automatically. FIG. 2 shows a flowchart of a program when automatic stoppage is carried out. The details thereof will be described with reference to the manufacturing system.

(15) Step of Exchanging Optical Display Units W (not Illustrated in FIG. 1)

The optical display unit W is fed to the position of bonding the optical film after passing the cleaning step, the inspection step, and others. When the cleaning step is carried out, first the optical display unit W is taken out from a storage box, and is mounted on a carrying mechanism. At the time of exchanging categories, the exchange of categories is carried out in units of storage boxes. Specifically, after all the optical display units W are taken out from a storage box of a previous category, new optical display units W are taken out from a storage box of a latter category. Also, the exchange of categories can be carried out also by adding optical display units W of the latter category to the storage box of the previous category. In the present invention, it is preferable that the optical display units W of the latter category be successively supplied subsequent to the optical display units W of the previous category.

Here, in the present invention, the optical display units W of the latter category may not be supplied until the bonding of the optical display units W of the previous category is completed; the optical display units W of the latter category may be supplied in a state in which the bonding apparatus is stopped after the bonding is completed; the cleaning step, the inspection step, and others may be carried out; and the optical film may be bonded by the bonding apparatus to the optical display unit W that is fed to the bonding position.

(Skip Cut Method)

Also, another embodiment of the first cutting step and the second cutting step will be described in the following. This embodiment is particularly effective when the first inspection step and the second inspection step are not provided. In some cases, defect information (defect coordinates, kind and size of defects, and the like) of the first and second sheet materials may be added as code information (for example, QR code or bar code) by a predetermined pitch unit (for example, 1000 mm) to one end in the width direction of the first and second material rolls. In such a case, as a previous step before cutting, this code information may be read and analyzed so that the sheet materials may be cut into predetermined sizes in the first and second cutting steps so as to avoid the defective parts (this may be referred to as skip cut). Then, the parts including the defects may be rejected or bonded to members which are not the optical display units, and the pieces of sheet materials cut into a predetermined size and determined to be non-defective may be bonded to the optical display units. This greatly enhances the yield ratio of the optical display devices.

(Overall Configuration of the Manufacturing System)

Next, an overall configuration of the manufacturing system of the present invention will be described. The manufacturing system of the present invention is a system for manufacturing an optical display device in which optical films are bonded to an optical display unit, and includes an optical display unit W feeding apparatus M1, a first optical film F11 feeding apparatus M2, a first bonding apparatus M3 that bonds the first optical film F11, a feeder M4 that carries and feeds the optical display unit W after bonding, a second optical film F21 feeding apparatus M5, a second bonding apparatus M6 that bonds the second optical film F21, and a controller 1, as illustrated in FIGS. 3 and 4.

In the present embodiment, as shown in FIG. 4, an example is shown in which the first optical film F11 feeding apparatus M2, the first bonding apparatus M3, the feeder M4, the second optical film F21 feeding apparatus M5, and the second bonding apparatus M6 are arranged in a straight line, and the feeding apparatus M1 is disposed so that the optical display unit W may be supplied in a direction perpendicular to the flow direction of the optical display unit W of the first bonding apparatus M3.

(Configuration of Each Section in the Manufacturing System)

In the following, one example of a configuration of each section in the manufacturing system of the present invention will be described.

The manufacturing system of the present invention includes an optical display unit W feeding apparatus M1 that feeds optical display units W. In the present embodiment, an example will be shown in which the optical display unit feeding apparatus M1 includes a polishing cleaning apparatus, a water cleaning apparatus, an inspection apparatus, and a drying apparatus. In the present invention, the optical display unit feeding apparatus M1 can be configured only with a feeding mechanism.

First, the polishing cleaning apparatus will be described. An optical display unit W is taken out from a storage box and mounted on a feeding mechanism. When the optical display unit W reaches a cleaning position, the feeding is stopped, and the end of the optical display unit W is held by holding means. Polishing means is brought into contact with the upper surface of the optical display unit W perpendicularly from above, and polishing means is brought into contact with the lower surface of the optical display unit W perpendicularly from below. The respective polishing means are rotated on both surfaces of the optical display unit W. In this manner, adherent contaminants on both surfaces of the optical display unit W will be removed. As the adherent contaminants, for example, minute pieces (cullets) of glass, fiber pieces, and the like can be exemplified.

Next, the water cleaning apparatus will be described. The polished and cleaned optical display unit W is fed to a water bath by the feeding mechanism to be cleaned with water there. Pure water flows through the inside of the water bath. Both surfaces of the optical display unit W fed from the water bath are further rinsed and cleaned by pure water flowing out from a water-flow pipe.

Subsequently, removal of water from the optical display unit W is carried out by sending a wind of cleaning air by the drying apparatus. Subsequently, the optical display unit W is fed to the first bonding apparatus 18. Here, as another embodiment, the cleaning can be carried out by using an aqueous solution of ethanol instead of pure water. Also, as still another embodiment, the water bath can be omitted.

The optical display unit W feeding apparatus M1 has a counting section that counts the feeding of the optical display units W. This counting section can be configured with a limit switch that will be turned on when an optical display unit W passes, an optical sensor that detects the shut-off of light, a rotation gauge that measures the rotation number at the time of passage, and the like. Also, the counting can be carried out based on image information that has been output from a camera.

This counting section (not illustrated in the drawings) may be placed at any position of the optical display unit W feeding apparatus M1; however, the counting section can be disposed in an apparatus that takes out the optical display units W from the storage box, the drying apparatus, or on the downstream side thereof. The counting section is adapted to output a counting signal to the controller 1 each time an optical display unit W passes, for example.

The manufacturing system of the present invention includes a first optical film feeding apparatus M2 that draws a long sheet material F1 having a first optical film F11 out from a roll on which the long sheet material is wound up and, after cutting into a predetermined length, feeds the long sheet material. In the present embodiment, an example will be shown in which the first optical film feeding apparatus M2 includes a first feeder 12, a first pre-inspection peeling apparatus, a first defect inspection apparatus 14, a first release film bonding apparatus, and a first cutting apparatus 16. In the present invention, since the first pre-inspection peeling apparatus, the first defect inspection apparatus 14, and the first release film bonding apparatus are provided, the inspection of the first optical film can be carried out with a good precision; however, these apparatuses can be omitted as well.

In the present invention, the first optical film feeding apparatus M2 is configured such that, in accordance with the long side and the short side of an optical display unit, an optical film having a width corresponding to the short side is cut by the length corresponding to the long side, or an optical film having a width corresponding to the long side is cut by the length corresponding to the short side. In the present embodiment, an example will be shown in which the first optical film feeding apparatus M2 is adapted to cut an optical film having a width corresponding to the short side of the optical display unit by the length corresponding to the long side.

The first material roll of the long first sheet material F1 is disposed in a roll mount apparatus that is interlocked with a motor or the like so as to rotate freely or to rotate at a constant rotation speed. The rotation speed is set and the driving control is carried out by the controller 1.

In the present invention, the optical film feeding apparatus includes a roll exchanging section for exchanging a roll of a previous category for a roll of a latter category and joining the optical films of the previous category and the latter category at the time of exchanging categories. In the present embodiment, the first optical film feeding apparatus M2 includes a first roll exchanging section for exchanging a first roll of a previous category for a first roll of a latter category and joining the first optical films of the previous category and the latter category at the time of exchanging categories.

The position of joining the first optical films is disposed typically between the first roll and the first nip roller or the like. However, since the number N1 is determined by using this as a standard, the position is preferably set at a predetermined position.

The first feeder 12 is a feeding mechanism that feeds the first sheet material F1 to the downstream side. The first feeder 12 is controlled by the controller 1.

The first pre-inspection peeling apparatus is adapted to peel the release film F12 off from the fed first sheet material F1 and winds it up onto the roll. The speed of winding up onto the roll is controlled by the controller 1. The peeling mechanism is configured such that the release film F12 is peeled off by reverse transfer of the release film F12 and the first sheet material F1 from which the release film F12 has been removed is fed to the feeding direction.

The first defect inspection apparatus 14 performs defect inspection after the release film F12 has been peeled off. The first defect inspection apparatus 14 analyzes image data captured by a CCD camera to detect defects, and further calculates the position coordinates thereof. The position coordinates of the defects are supplied to the skip cut performed by a later-mentioned first cutting apparatus 16.

After the first defect inspection, the first release film bonding apparatus bonds the release film F12 onto the first optical film F11 with a first pressure-sensitive adhesive layer F14 interposed therebetween. The release film F12 is drawn out from a material roll of the release film F12; the release film F12 and the first optical film F11 are sandwiched and held by one or plural pairs of rollers; and the two films are bonded by allowing the roller pair to apply a predetermined pressure. The rotation speed of the roller pair, the pressure control, and the feeding control are controlled by the controller 1.

After bonding the release film F12, the first cutting apparatus 16 cuts the first optical film F11, the surface protecting film F13, the first pressure-sensitive adhesive layer F14, and the pressure-sensitive adhesive layer F15 into a predetermined size without cutting the release film F12. The first cutting apparatus 16 is, for example, a laser apparatus. Based on the position coordinates of the defects detected by the first defect inspection process, the first cutting apparatus 16 cuts into a predetermined size so as to avoid the defective parts. In other words, the cut material containing the defective parts is rejected as a defective material by the first rejection apparatus 19 in a later step. Alternatively, the first cutting apparatus 16 may cut into a predetermined size continuously by ignoring the presence of the defects. In this case, it can be configured such that the relevant parts are removed without being bonded in a bonding process described later. The control of this case also is a function of the controller 1.

Also, the first cutting apparatus 16 arranges a holding table that adsorbs and holds the first sheet material F1 from the back surface, and is provided with a laser apparatus above the first sheet material F1. The first cutting apparatus 16 moves horizontally so as to scan in the width direction of the first sheet material F1 with laser, and cuts the first optical film F11, the first pressure-sensitive adhesive layer F14, the surface protecting film F13, and the pressure-sensitive adhesive layer F15 at a predetermined pitch in the feeding direction thereof (hereafter suitably referred to as "half cut") while leaving the release film F12 of the lowermost part. In the case of adsorbing the first sheet material F1 with the holding table, the accumulator of the feeding mechanism is adapted to move in the vertical up-and-down direction so as not to stop the continuous feeding of the first sheet material F1 on the downstream side and the upstream side thereof. This operation is also controlled by the controller 1.

The manufacturing system of the present invention includes a first bonding apparatus 18 (M3) that bonds the first optical film F11 fed from the first optical film feeding apparatus M2 onto one surface of the optical display unit W fed from the optical display unit W feeding apparatus M1. In the present embodiment, an example is shown in which the first bonding apparatus 18 (M3) is configured with a press roller and a guide roller, and further includes a first peeling apparatus 17 and a first rejection apparatus 19. This first rejection apparatus 19 constitutes a defective part rejection mechanism that cuts and rejects the defective parts of the optical film together with the first cutting apparatus 16; however, such a rejection mechanism can be omitted as well.

After the aforementioned cutting process, the first bonding apparatus 18 bonds the first sheet material F1 (first optical film F11), from which the release film F12 has been peeled off by the first peeling apparatus 17, onto the optical display unit W with the first pressure-sensitive adhesive layer F14 interposed therebetween. The feeding path of the first sheet material F1 is above the feeding path of the optical display unit W.

In the case of bonding, the bonding is carried out by pressing the first optical film F11 onto the optical display unit W surface by the press roller and the guide roller. The pressing pressure and the driving operation of the press roller and the guide roller are controlled by the controller 1.

As the peeling mechanism of the first peeling apparatus 17, it is configured such that, by inverse transfer of the release film F12, the release film F12 is peeled off, and the first sheet material F1 (first optical film F11) from which the release film F12 has been peeled off is sent to the optical display unit W surface. The release film F12 that has been peeled off is wound up onto a roll. The winding-up control of the roll is controlled by the controller 1.

In other words, the first optical film feeding apparatus M2 in the present invention has a feeding mechanism that feeds the first optical film F11 to the first bonding apparatus M3 by using, as a carrying medium, the release film formed on the optical film with the pressure-sensitive adhesive layer interposed therebetween.

The bonding mechanism is configured by a press roller and a guide roller arranged to be opposite thereto that are disposed at the bonding position. The guide roller is configured with a rubber roller that is rotated and driven by a motor, and is disposed to be capable of ascending and descending. Also, immediately above this, the press roller made of a metal roller that is rotated and driven by a motor is disposed to be capable of ascending and descending. At the time of sending the optical display unit W to the bonding position, the press roller is elevated to a position higher than the upper surface thereof, so as to enlarge the roller interval. Here, each of the guide roller and the press roller may be either a rubber roller or a metal roller. As described above, the optical display unit W is adapted to be cleaned by various cleaning apparatuses and to be fed by the feeding mechanism. The feeding control of the feeding mechanism is also by the control of the controller 1.

The first rejection apparatus 19 that rejects the first sheet material F1 containing the defects will be described. When a first sheet material F1 containing defects is fed to the bonding position, the guide roller moves vertically downwards. Next, a roller over which a removal tape has been hung moves to a defined position of the guide roller. By moving the press roller vertically downwards, the first sheet material F1 containing the defects is pressed onto the removal tape so as to bond the first sheet material F1 onto the removal tape, and the first sheet material F1 containing the defects is wound up onto a roller together with the removal tape.

The optical display unit W onto which the first optical film F11 has been bonded in the above-described manner is carried to the downstream side, where the second optical film F21 (second sheet material F2) is bonded. In the following, a similar apparatus configuration will be described briefly.

The manufacturing system of the present invention includes a feeder M4 that carries and feeds the optical display unit W after the first optical film F11 is bonded. This feeder M4 preferably has a turning mechanism 20 that turns the optical display unit W bonded by the first bonding apparatus 18 in the bonding direction of the second bonding apparatus 28.

For example, in the case of bonding the second optical film F21 in a relationship of 90° to the first optical film F11 (crossed nicols relationship), the second optical film F21 is bonded after the optical display unit W is rotated by 90° by the feeding direction switching mechanism (turning mechanism 20) of the feeding mechanism. In the method of bonding the second sheet material F2 described in the following, it is configured such that each step is processed in a state in which the second sheet material F2 is inverted (so that the release film will be the upper surface), and the second optical film F21 is bonded from the lower side of the optical display unit W.

The manufacturing system of the present invention includes a second optical film feeding apparatus M5 that draws a long sheet material F2 having a second optical film F21 out from a roll on which the long sheet material is wound up and, after cutting into a predetermined length, feeds the long sheet material. In the present embodiment, an example will be shown in which the second optical film feeding apparatus M5 includes a second feeder 22, a second pre-inspection peeling apparatus, a second defect inspection apparatus 24, a second release film bonding apparatus, and a second cutting apparatus 26. In the present invention, since the second pre-inspection peeling apparatus, the second defect inspection apparatus 24, and the second release film bonding apparatus are provided, the inspection of the second optical film can be carried out with a good precision; however, these apparatuses can be omitted as well.

In the present invention, the second optical film feeding apparatus M5 is configured such that, in accordance with the long side and the short side of an optical display unit W, an optical film having a width corresponding to the short side is cut by the length corresponding to the long side, or an optical film having a width corresponding to the long side is cut by the length corresponding to the short side. In the present embodiment, an example will be shown in which the second optical film feeding apparatus M5 is adapted to cut an optical film F21 having a width corresponding to the long side of the optical display unit W by the length corresponding to the short side.

The second material roll of the long second sheet material F2 is disposed in a roll mount apparatus that is interlocked with a motor or the like so as to rotate freely or to rotate at a constant rotation speed. The rotation speed is set and the driving control is carried out by the controller 1.

In the present embodiment, the second optical film feeding apparatus M5 includes a second roll exchanging section for exchanging a second roll of a previous category for a second roll of a latter category and joining the second optical films of the previous category and the latter category at the time of exchanging categories.

The position of joining the second optical films is disposed typically between the second roll and the first nip roller or the like. However, since the number N2 is determined by using this as a standard, the position is preferably set at a predetermined position.

The second feeder 22 is a feeding mechanism that feeds the second sheet material F2 to the downstream side. The second feeder 22 is controlled by the controller 1.

The second pre-inspection peeling apparatus is adapted to peel the release film F22 off from the fed second sheet material F2 and winds it up onto the roll. The speed of winding up onto the roll is controlled by the controller 1. The peeling mechanism is configured such that the release film F22 is peeled off by reverse transfer of the release film F22 and to feed the second sheet material F2 from which the release film F22 has been removed to the feeding direction.

The second defect inspection apparatus 24 performs defect inspection after the release film F22 has been peeled off. The second defect inspection apparatus 24 analyzes image data captured by a CCD camera to detect defects, and further calculates the position coordinates thereof. The position coordinates of the defects are supplied to the skip cut performed by a later-mentioned second cutting apparatus 26.

The manufacturing system of the present invention includes a second bonding apparatus 28 (M6) that bonds the second optical film F21 fed from the second optical film feeding apparatus M5 onto the other surface of the optical display unit W fed from the feeder M4. In the present embodiment, an example is shown in which the second bonding apparatus 28 (M6) is configured with a press roller and a guide roller, and further includes a second peeling apparatus 27 and a second rejection apparatus 29. This second rejection apparatus 29 constitutes a defective part rejection mechanism that cuts and rejects the defective parts of the optical film together with the second cutting apparatus 26; however, such a rejection mechanism can be omitted as well.

After the second defect inspection, the second release film bonding apparatus bonds the release film F22 onto the second optical film F21 with a second pressure-sensitive adhesive layer F24 interposed therebetween. The release film F22 is drawn out from a material roll of the release film F22; the release film F22 and the second optical film F21 are sandwiched and held by one or plural pairs of rollers; and the two films are bonded by allowing the roller pair to apply a predetermined pressure. The rotation speed of the roller pair, the pressure control, and the feeding control are controlled by the controller 1.

After bonding the release film F22, the second cutting apparatus 26 cuts the second optical film F21, the surface protecting film F23, the second pressure-sensitive adhesive layer F24, and the pressure-sensitive adhesive layer F25 into a predetermined size without cutting the release film F22. The second cutting apparatus 26 is, for example, a laser apparatus. Based on the position coordinates of the defects detected by the second defect inspection process, the second cutting apparatus 26 cuts into a predetermined size so as to avoid the defective parts. In other words, the cut material containing the defective parts is rejected as a defective material by the second rejection apparatus 29 in a later step. Alternatively, the second cutting apparatus 26 may cut into a predetermined size continuously by ignoring the presence of the defects. In this case, it can be configured such that the relevant parts are removed without being bonded in a bonding process described later. The control of this case also is a function of the controller 1.

Also, the second cutting apparatus 26 arranges a holding table that adsorbs and holds the second sheet material F2 from the back surface, and is provided with a laser apparatus below the second sheet material F2. The second cutting apparatus 26 moves horizontally so as to scan in the width direction of the second sheet material F2 with laser, and cuts the second optical film F21, the second pressure-sensitive adhesive layer F24, the surface protecting film F23, and the pressure-sensitive adhesive layer F25 at a predetermined pitch in the feeding direction thereof while leaving the release film F22 of the lowermost part. In the case of adsorbing the second sheet material F2 with the holding table, the accumulator of the feeding mechanism is adapted to move in the vertical up-and-down direction so as not to stop the continuous feeding of the second sheet material F2 on the downstream side and the upstream side thereof. This operation is also controlled by the controller 1.

After the aforementioned cutting process, the second bonding apparatus 28 bonds the second sheet material F2 (second optical film F21), from which the release film F22 has been peeled off by the second peeling apparatus 27, onto the optical display unit W with the second pressure-sensitive adhesive layer F24 interposed therebetween. In the case of bonding, the bonding is carried out by pressing the second optical film F21 onto the optical display unit W surface by the press roller and the guide roller. The pressing pressure and the driving operation of the press roller and the guide roller are controlled by the controller 1.

As the peeling mechanism of the second peeling apparatus 27, it is configured such that, by inverse transfer of the release film F22, the release film F22 is peeled off, and the second sheet material F2 (second optical film) from which the release film F22 has been peeled off is sent to the optical display unit W surface. The release film F22 that has been peeled off is wound up onto a roll. The winding-up control of the roll is controlled by the controller 1.

In other words, the second optical film feeding apparatus M5 in the present invention has a feeding mechanism that feeds the second optical film F21 to the second bonding apparatus M6 by using, as a carrying medium, the release film formed on the optical film with the pressure-sensitive adhesive layer interposed therebetween.

The bonding mechanism is configured by a press roller and a guide roller arranged to be opposite thereto that are disposed at the bonding position. The guide roller is configured with a rubber roller that is rotated and driven by a motor, and is disposed to be capable of ascending and descending. Also, immediately below this, the press roller made of a metal roller that is rotated and driven by a motor is disposed to be capable of ascending and descending. At the time of sending the optical display unit W to the bonding position, the press roller is moved to a lower position so as to enlarge the roller interval. Here, each of the guide roller and the press roller may be either a rubber roller or a metal roller.

The second rejection apparatus 29 that rejects the second sheet material F2 containing the defects will be described. When a second sheet material F2 containing defects is fed to the bonding position, the guide roller moves vertically upwards. Next, a roller over which a removal tape has been hung moves to a defined position of the guide roller. By moving the press roller vertically upwards, the second sheet material F2 containing the defects is pressed onto the removal tape so as to bond the second sheet material F2 onto the removal tape, and the second sheet material F2 containing the defects is wound up onto a roller together with the removal tape.

The optical display device formed by bonding the first and second sheet materials onto the optical display unit W is fed to an inspection apparatus. The inspection apparatus performs inspection on both surfaces of the optical display device that has been fed. A light source irradiates perpendicularly the upper surface of the optical display device with light by use of a half mirror, and the reflected image thereof is captured as image data by a CCD camera. Also, another light source irradiates at a predetermined angle the optical display device surface with light, and the reflected image thereof is captured as image data by a CCD camera. The inspection of the opposite surface of the optical display device is also performed with use of a light source and a CCD camera. From these image data, the defects are subjected to image processing analysis, and determination of being non-defective or not is carried out.

The operation timing of each apparatus is calculated by a method of disposing a sensor at a predetermined position and performing detection. Alternatively, it is calculated by detecting the rotary member of the feeder or feeding mechanism with use of a rotary encoder or the like. The controller 1 may be realized by a cooperative action of a software program and hardware resources such as a CPU and a memory. In this case, the program software, the processing procedure, various settings, and the like are stored in the memory in advance. Also, it can be configured with an exclusive-use circuit or a firmware.

In the present invention, operation or stoppage of each apparatus can be carried out by the controller 1. The controller 1 stores the number N of optical display units that are bonded substantially in correspondence with the optical films that are present from the joining position of the optical film to the bonding position of the optical film, and stops each apparatus when the number X of remaining sheets of the optical display units of the previous category prior to bonding becomes substantially equal to the number N at the time of exchanging categories based on information from the counting section.

In the case of the illustrated manufacturing system, this controller 1 stores the number N1 of optical display units that are bonded substantially in correspondence with the first optical films that are present from the joining position of the first optical film to the bonding position of the first optical film, and stores the number N2 of optical display units that are bonded substantially in correspondence with the second optical films that are present from the joining position of the second optical film to the bonding position of the second optical film.

Further, this controller 1 stops each apparatus when the number X of remaining sheets of the optical display units of the previous category prior to bonding becomes substantially equal to the number N1 or the number N2, whichever is larger, and after operating each apparatus, stops each apparatus when the number X of remaining sheets of the optical display units of the previous category prior to bonding becomes substantially equal to the number N1 or the number N2, whichever is smaller, at the time of exchanging categories based on information from the counting section. Here, the controller 1 may stop each of the apparatuses when the number X of remaining sheets of the optical display units of the previous category prior to bonding becomes substantially equal to the aforesaid number N1 or the aforesaid number N2 at the time of exchanging categories.

A flowchart of a specific program in performing the above-described control may be, for example, the one shown in FIG. 2. This flowchart is an example in which the number N1 is larger than the number N2.

This program has a loop structure and is, by step S30, in a state of waiting for input of a number X0. Here, the number X0 is a numerical value that is input at some time point at the time of exchanging categories, and is the number X0 of remaining sheets of the optical display units of the previous category prior to bonding at a certain time point. In the present invention, for example, by using this as a standard, the number X of remaining sheets of the optical display units in the inside of the manufacturing system is calculated based on information from the counting section.

When the number X0 is input, the number X is defined as the number X0 by step S21, and the process will be in a state of waiting for input of a counting signal by step S22. When a counting signal is input from the counting section by passage (that is, feeding) of an optical display unit, the number X is defined as X-1 by step S23. By step S24, the number X is compared with the number N1, and the processes from step S22 to step S24 are repeated until the two become equal to each other.

When the number X becomes equal to the number N1, an automatic stoppage signal of each apparatus is output from the controller 1. This stops the first optical film F11 feeding apparatus M2, the first bonding apparatus M3, the feeder M4, the second optical film F21 feeding apparatus M5, and the second bonding apparatus M6.

On the program, the process will be in a state of waiting for input of a counting signal by step S26. However, during the stoppage, the first roll exchanging step corresponding to the number N1 is performed. After the completion, each apparatus is operated, and the first bonding step and the second bonding step are started again.

In this manner, when a counting signal is input by passage of an optical display unit, the number X is defined as X-1 by step S27. By step S28, the number X is compared with the number N2, and the processes from step S26 to step S28 are repeated until the two become equal to each other.

When the number X becomes equal to the number N2, an automatic stoppage signal of each apparatus is output from the controller 1. This stops the first optical film F11 feeding apparatus M2, the first bonding apparatus M3, the feeder M4, the second optical film F21 feeding apparatus M5, and the second bonding apparatus M6.

On the program, the process will be in a state of waiting for input of the number X0 by step S30. However, during the stoppage, the second roll exchanging step corresponding to the number N2 is performed. After the completion, each apparatus is operated, and the first bonding step and the second bonding step are started again.

When the optical display units of a latter category are successively supplied subsequently to the optical display units of a previous category, the bonding of the optical display units of the latter category can be carried out immediately after the bonding of the optical display units of the previous category is completed. When the exchange of categories is performed again in carrying out the bonding of the optical display units of the latter category, the number X0 is input again. This starts the program again.

The example shown in FIG. 2 is an example in which the number N1 is larger than the number N2. When the number N1 is smaller than the number N2, step S24 will be a comparison with the number N2, and step S28 will be a comparison with the number N1. Also, when each apparatus is stopped, the roll exchange steps are carried out in the order of the second roll exchanging step to the first roll exchanging step.

Also, when the number N1 is substantially equal to the number N2, the processes from step S26 to step S29 can be omitted and, when each apparatus is stopped, the first roll exchanging step and the second roll exchanging step can be carried out.

On the other hand, in the present invention, the conditions for the inspection step, the cutting step, and the like of the optical films may be different between before and after the exchange of categories. In this case, the conditions for the inspection step, the cutting step, and the like must be changed before and after the exchange of categories.

In order to perform this, it is preferable that the tip end of the optical film of the latter category be detected and, in performing the inspection step, the cutting step, and the like of the optical films of the latter category, the conditions therefor be changed to the conditions for the optical films of the latter category. Therefore, in the present invention, it is preferable that a detection apparatus for detecting the joining part of the optical films of the previous category and the latter category be provided. Also, it is preferable that the controller 1 store at least the cutting conditions of the optical films of the previous category and the latter category, and perform control of switching at least the cutting condition from the previous category to the latter category based on the information from the detection apparatus.

On the other hand, when skip cut is carried out in accordance with the defects of the optical film, even if the roll exchanging step is carried out when the number X of remaining sheets of the optical display units of the previous category prior to bonding becomes equal to the number N, there may be, in some cases, no more optical films of the previous category before bonding all the optical display units. In other words, the number of sheets of the optical film that are subjected to skip cut will be insufficient relative to the optical display units of the previous category.

When the yield ratio is approximately 100%, there is no need to consider this insufficiency. However, when the insufficiency is considered, it is preferable to perform the roll exchanging step when the number X of remaining sheets of the optical display units of the previous category prior to bonding becomes equal to the number N+expected number of lacking sheets. The "expected number of lacking sheets" can be calculated, for example, by (number N)×(1−yield ratio of optical film in terms of the number of sheets). When the number N is 30 and the yield ratio of optical film in terms of the number of sheets is 0.9, the "expected number of lacking sheets" will be 3, so that it is preferable to perform the roll exchanging step when the number X of remaining sheets of the optical display units of the previous category prior to bonding becomes equal to the number N+3.

Also, in consideration of the local decrease of the yield ratio (that is, in consideration of safety), the number X may be compared with about the double of the "expected number of lacking sheets". For example, in the above-described example, it is possible to perform the roll exchanging step when the number X of remaining sheets of the optical display units of the previous category prior to bonding becomes equal to the number N+6.

Also, when the state of the accumulator is different from the state in which the number N is determined, there may be cases in which the optical film will be excessive or insufficient relative to the optical display units of the previous category depending on the difference of the states. For this reason, in the present invention, it is preferable to compare the number X with a number in the range of the number N to the number N+6.

In this manner, in the case of stopping each apparatus when the number X of remaining sheets of the optical display units of the previous category prior to bonding is substantially equal to the number N instead of being identical, for example, a case can be exemplified in which step S24 of the program shown in FIG. 2 is performed under a conditional formula of "number X=number N1+3", and step S28 is performed under a conditional formula of "number X=number N2+3".

The optical display device manufactured by the present invention can be applied to image display devices such as liquid crystal display devices, organic EL display devices, and PDPs.

The forming of the liquid crystal display devices can be carried out in accordance with a conventional manner. In other words, the liquid crystal display devices are typically formed by suitably assembling liquid crystal cells (corresponding to the optical display units), the optical films, and as needed, constituent components such as an illumination system, and incorporating a driving circuit. In the present invention, there is not a particular limitation except that the optical films are used, so that the forming can be carried out in accordance with a conventional procedure.

A liquid crystal display device in which an optical film is arranged on one side or on both sides of a liquid crystal cell, or a suitable liquid crystal display device such as one using a backlight or a reflection plate in an illumination system can be formed. In that case, the optical film can be arranged on one side or on both sides of the liquid crystal cell. In the case of disposing the optical films on both sides, they may be the same one or different ones. Further, in forming the liquid crystal display device, suitable components such as a diffusion plate, an anti-glare layer, an anti-reflection film, a protective plate, a prism array, a lens array sheet, a light diffusion plate, or a backlight, for example, can be arranged in one layer or in two or more layers at a suitable position.

The liquid crystal display device can be formed to have a suitable structure similar to conventional ones of a transmittance type, a reflection type or a transmittance and reflection combined type in which the optical films are arranged on one side or on both sides of the liquid crystal cell. Therefore, the liquid crystal cell for forming the liquid crystal display device is arbitrary, and the liquid crystal display device may be one using a liquid crystal cell of a suitable type such as an active matrix driving type represented by a thin film transistor type.

Also, in providing a polarizing plate or an optical member on both sides of the liquid crystal cell, they may be the same one or may be different ones. Further, in forming the liquid crystal display device, suitable components such as a prism array sheet, a lens array sheet, a light diffusion plate, or a backlight, for example, can be arranged in one layer or in two or more layers at a suitable position.

The invention claimed is:

1. A system for manufacturing an optical display device in which an optical film is bonded to an optical display unit, comprising:
an optical display unit feeding apparatus that successively feeds optical display units;
an optical film feeding apparatus that draws a long sheet material having an optical film out from a roll on which the long sheet material is wound up, cuts at least the optical film into a predetermined length, and feeds the long sheet material having the optical film cut;
a bonding apparatus that bonds the optical film cut fed from the optical film feeding apparatus onto a surface of the optical display unit fed from the optical display unit feeding apparatus; and
a controller that operates or stops each of the apparatuses, wherein
the optical film feeding apparatus has a roll exchanging section for exchanging a roll of a previous category for a roll of a latter category and joining the optical films of the previous category and the latter category at the time of exchanging categories of the optical display unit,
the optical display unit feeding apparatus has a counting section that counts the number of optical display units that have been fed by the optical display unit feeding apparatus, and
the controller stores the number N of optical display units that may be bonded substantially in correspondence with the length of optical film that is present from a joining position of the optical film to a bonding position of the optical film, and stops each of the apparatuses when the number X of remaining optical display units of the previous category prior to bonding becomes substantially equal to the number N at the time of exchanging categories of the optical display unit based on information from the counting section.

2. A system for manufacturing an optical display device in which optical films are bonded to an optical display unit, comprising:
an optical display unit feeding apparatus that successively feeds optical display units;
a first optical film feeding apparatus that draws a long sheet material having a first optical film out from a first roll on which the long sheet material is wound up, cuts at least the first optical film into a predetermined length, and feeds the long sheet material having the first optical film cut;
a first bonding apparatus that bonds the first optical film cut fed from the first optical film feeding apparatus onto one surface of the optical display unit fed from the optical display unit feeding apparatus;
a feeder that carries and feeds the optical display unit after the first optical film is bonded;
a second optical film feeding apparatus that draws a long sheet material having a second optical film out from a second roll on which the long sheet material is wound up, cuts at least the second optical film into a predetermined length, and feeds the long sheet material having the second optical film cut;
a second bonding apparatus that bonds the second optical film cut fed from the second optical film feeding apparatus onto the other surface of the optical display unit fed from the feeder; and
a controller that operates or stops each of the apparatuses, wherein
the first optical film feeding apparatus has a first roll exchanging section for exchanging a first roll of a previous category for a first roll of a latter category and joining the first optical films of the previous category and the latter category at the time of exchanging categories of the optical display unit,
the second optical film feeding apparatus has a second roll exchanging section for exchanging a second roll of a previous category for a second roll of a latter category and joining the second optical films of the previous category and the latter category at the time of exchanging categories of the optical display unit,
the optical display unit feeding apparatus has a counting section that counts the number of optical display units that have been fed by the optical display unit feeding apparatus,
the controller stores the number N1 of optical display units that may be bonded substantially in correspondence with the length of the first optical film that is present from a joining position of the first optical film to a bonding position of the first optical film, and stores the number N2 of optical display units that may be bonded substantially in correspondence with the length of the second optical film that is present from a joining position of the second optical film to a bonding position of the second optical film, and
the controller stops each of the apparatuses when the number X of remaining optical display units of the previous category prior to bonding becomes substantially equal to the number N1 or the number N2 at the time of exchanging categories of the optical display unit based on information from the counting section.

3. A system for manufacturing an optical display device in which optical films are bonded to an optical display unit, comprising:
- an optical display unit feeding apparatus that successively feeds optical display units;
- a first optical film feeding apparatus that draws a long sheet material having a first optical film out from a first roll on which the long sheet material is wound up, cuts at least the first optical film into a predetermined length, and feeds the long sheet material having the first optical film cut;
- a first bonding apparatus that bonds the first optical film cut fed from the first optical film feeding apparatus onto one surface of the optical display unit fed from the optical display unit feeding apparatus;
- a feeder that carries and feeds the optical display unit after the first optical film is bonded;
- a second optical film feeding apparatus that draws a long sheet material having a second optical film out from a second roll on which the long sheet material is wound up, cuts at least the second optical film into a predetermined length, and feeds the long sheet material having the second optical film cut;
- a second bonding apparatus that bonds the second optical film cut fed from the second optical film feeding apparatus onto the other surface of the optical display unit fed from the feeder; and
- a controller that operates or stops each of the apparatuses, wherein the first optical film feeding apparatus has a first roll exchanging section for exchanging a first roll of a previous category for a first roll of a latter category and joining the first optical films of the previous category and the latter category at the time of exchanging categories of the optical display unit, the second optical film feeding apparatus has a second roll exchanging section for exchanging a second roll of a previous category for a second roll of a latter category and joining the second optical films of the previous category and the latter category at the time of exchanging categories of the optical display unit, the optical display unit feeding apparatus has a counting section that counts the number of optical display units that have been fed by the optical display unit feeding apparatus, the controller stores the number N1 of optical display units that may be bonded substantially in correspondence with the length of first optical film that is present from a joining position of the first optical film to a bonding position of the first optical film, and stores the number N2 of optical display units that may be bonded substantially in correspondence with the length of second optical film that is present from a joining position of the second optical film to a bonding position of the second optical film, and the controller stops each of the apparatuses when the number X of remaining optical display units of the previous category prior to bonding becomes substantially equal to the number N1 or the number N2, whichever is larger, and after operating each of the apparatuses, stops each of the apparatus when the number X of remaining optical display units prior to bonding becomes substantially equal to the number N1 or the number N2, whichever is smaller, at the time of exchanging categories of the optical display unit based on information from the counting section.

4. The system for manufacturing an optical display device according to any one of claims 1 to 3, wherein the controller receives, at some time point in advance, an input of the number X0 of remaining optical display units of the previous category prior to bonding at the time of exchanging categories, and calculates the number X based on this number X0 and the information from the counting section.

5. The system for manufacturing an optical display device according to claim 1, wherein the number X of remaining optical display units is set to the number obtained by adding a predetermined number to the N.

6. The system for manufacturing an optical display device according to claim 2 or 3, wherein the number X of remaining optical display units is set to the number obtained by adding a predetermined number to the N1 or the number obtained by adding a predetermined number to the N2.

* * * * *